US 9,524,483 B2

(12) United States Patent
Henson et al.

(10) Patent No.: US 9,524,483 B2
(45) Date of Patent: Dec. 20, 2016

(54) WATER CONVERSION SYSTEM

(71) Applicant: Advanced Aqua Group, Jacksonville, FL (US)

(72) Inventors: Larry K. Henson, Jacksonville, FL (US); Edward C. Szvetecz, Atlanta, GA (US)

(73) Assignee: Advanced Aqua Group, Jacksonville, FL (US)

( * ) Notice: Subject to any disclaimer, the term of this patent is extended or adjusted under 35 U.S.C. 154(b) by 961 days.

(21) Appl. No.: 13/627,713

(22) Filed: Sep. 26, 2012

(65) Prior Publication Data
US 2013/0126431 A1 May 23, 2013

Related U.S. Application Data

(63) Continuation-in-part of application No. 13/304,158, filed on Nov. 23, 2011, now Pat. No. 9,322,258.

(51) Int. Cl.
*B01D 61/00* (2006.01)
*B01D 63/00* (2006.01)
(Continued)

(52) U.S. Cl.
CPC ............... *G06Q 10/08* (2013.01); *C02F 9/00* (2013.01); *C02F 1/048* (2013.01); *C02F 1/20* (2013.01);
(Continued)

(58) Field of Classification Search
CPC ............... C02F 1/72; C02F 9/02; C02F 1/444; C02F 1/463; B01D 61/02
(Continued)

(56) References Cited

U.S. PATENT DOCUMENTS 4,534,869 A 8/1985 Seibert
5,372,596 A 12/1994 Klicek et al.
(Continued)

FOREIGN PATENT DOCUMENTS

ES       2165824 A1    3/2002
KR    20060078594 A    7/2006
WO  WO-2007013099 A1  2/2007

OTHER PUBLICATIONS

International Search Report in PCT Application No. PCT/US2012/065819 dated Jan. 25, 2013, 3 pages.
(Continued)

Primary Examiner — Ana Fortuna
(74) Attorney, Agent, or Firm — Haynes and Boone, LLP

(57) ABSTRACT

A system for converting contaminated water, such as produced water, frack flow back water, and other contaminated water from industrial sources into fresh, non-contaminated, or potable water includes a registration and verification unit for registering intake water loads and verifying their content; a receiving system for temporarily isolating each load; an equalization basin for creating an homogenized water source; an electro-coagulation unit in which one or more of the voltage, current, pulse frequency and application time are variable and controlled by one or more of a conductivity sensor; a pH sensor; a level sensor; an ultrafiltration unit for removing organics; a nanofiltration unit; a reverse osmosis unit, and an electrodyalisis unit. The processed concentrate remaining after the water is converted is dewatered via a forward osmosis unit.

12 Claims, 11 Drawing Sheets

(51) Int. Cl.

| | | |
|---|---|---|
| *C02F 1/44* | (2006.01) | |
| *G06Q 10/08* | (2012.01) | |
| *C02F 9/00* | (2006.01) | |
| *C02F 1/04* | (2006.01) | |
| *C02F 1/20* | (2006.01) | |
| *C02F 1/40* | (2006.01) | |
| *C02F 1/46* | (2006.01) | |
| *C02F 1/463* | (2006.01) | |
| *C02F 1/469* | (2006.01) | |
| *C02F 1/68* | (2006.01) | |
| *C02F 1/72* | (2006.01) | |
| *C02F 1/76* | (2006.01) | |
| *C02F 5/06* | (2006.01) | |
| *C02F 11/12* | (2006.01) | |
| *C02F 1/52* | (2006.01) | |
| *C02F 101/32* | (2006.01) | |
| *C02F 103/00* | (2006.01) | |
| *C02F 103/10* | (2006.01) | |
| *C02F 103/32* | (2006.01) | |
| *C02F 103/36* | (2006.01) | |

(52) U.S. Cl.
CPC .............. *C02F 1/40* (2013.01); *C02F 1/441* (2013.01); *C02F 1/442* (2013.01); *C02F 1/444* (2013.01); *C02F 1/445* (2013.01); *C02F 1/4602* (2013.01); *C02F 1/463* (2013.01); *C02F 1/4693* (2013.01); *C02F 1/68* (2013.01); *C02F 1/72* (2013.01); *C02F 1/722* (2013.01); *C02F 1/76* (2013.01); *C02F 5/06* (2013.01); *C02F 11/12* (2013.01); *C02F 2001/5218* (2013.01); *C02F 2101/32* (2013.01); *C02F 2101/322* (2013.01); *C02F 2103/008* (2013.01); *C02F 2103/10* (2013.01); *C02F 2103/322* (2013.01); *C02F 2103/365* (2013.01); *C02F 2203/002* (2013.01); *C02F 2209/005* (2013.01); *C02F 2209/008* (2013.01); *C02F 2209/02* (2013.01); *C02F 2209/05* (2013.01); *C02F 2209/06* (2013.01); *C02F 2209/40* (2013.01); *C02F 2209/42* (2013.01); *C02F 2303/24* (2013.01)

(58) Field of Classification Search
USPC .... 210/638, 202, 96.2, 104, 103, 651, 257.2
See application file for complete search history.

(56) References Cited

U.S. PATENT DOCUMENTS

| | | | |
|---|---|---|---|
| 6,294,061 B1 | 9/2001 | Morkovsky et al. | |
| 6,355,145 B1 | 3/2002 | Kresnyak et al. | |
| 6,375,803 B1 | 4/2002 | Razzaghi et al. | |
| 6,536,523 B1 | 3/2003 | Kresnyak et al. | |
| 6,551,466 B1 | 4/2003 | Kresnyak et al. | |
| 6,902,678 B2 * | 6/2005 | Tipton | B63J 4/002 |
| | | | 204/560 |
| 7,520,993 B1 * | 4/2009 | Laraway | B01D 61/58 |
| | | | 210/175 |
| 9,138,688 B2 * | 9/2015 | Prakash | C02F 1/463 |
| 2003/0173300 A1 * | 9/2003 | Bradley | B01D 17/0217 |
| | | | 210/665 |
| 2005/0011839 A1 | 1/2005 | Dart et al. | |
| 2005/0269271 A1 | 12/2005 | Umezawa et al. | |
| 2007/0102359 A1 | 5/2007 | Lombardi et al. | |
| 2009/0107915 A1 * | 4/2009 | Skinner | C02F 9/00 |
| | | | 210/636 |
| 2009/0114598 A1 | 5/2009 | van Kralingen et al. | |
| 2010/0193360 A1 | 8/2010 | McGuire et al. | |
| 2010/0219082 A1 | 9/2010 | Diaz Gonzalez Alcocer | |
| 2011/0089123 A1 | 4/2011 | Kennedy et al. | |
| 2011/0180422 A1 | 7/2011 | Mothersbaugh et al. | |
| 2011/0201701 A1 | 8/2011 | Lucas et al. | |
| 2011/0210075 A1 * | 9/2011 | Enos | C02F 1/4602 |
| | | | 210/702 |
| 2011/0266227 A1 | 11/2011 | Yamaguchi et al. | |
| 2013/0313191 A1 * | 11/2013 | Wolf | C02F 9/00 |
| | | | 210/638 |
| 2014/0216749 A1 * | 8/2014 | Lord | C09K 8/66 |
| | | | 166/308.1 |

OTHER PUBLICATIONS

Koch Membrane Systems; "Tubular Membranes Provide a Constant Flow of Solid Solutions," www.kochmembrane.com/prod_tubular.html; 2011.

Magnus, Richard; "Fountain Quail Water Management Press Release," Oct. 25, 2011; Roanoke, Texas.

* cited by examiner

WATER CONVERSION SYSTEM

BACKGROUND

1. Field of Invention

This invention pertains to large scale, industrial water purification systems. More particularly, the invention pertains to a water conversion system for converting contaminated water, such as produced water and frack flow back water from hydrocarbon field drilling and hydrocarbon production, and from other contamination sources, to fresh, non-contaminated or potable water.

2. Description of the Related Art

Hydrocarbon wells typically produce water in addition to oil and gas. This water is called "produced water." Produced water often arises from the fact that oil and gas reservoirs have a natural water layer (formation water) that lies under the hydrocarbons. Further, to achieve maximum oil recovery, additional water is often injected into the reservoirs to help force the oil to the surface or break up the formation to produce more oil and/or gas, which is referred to as "fracking." A significant percentage of the injected water, referred to as "frack flow back water" or "simple flow back water" herein, flows back out of the well, particularly in the first few weeks of production from the well after fracking. Modern industrial operations, such as soy food processing and refining, cleaning of sea water in ships and oil platforms, and many other industrial operations produce contaminated water sources.

In the prior art, produced water, flow back water, mining water, and other contaminated waters were disposed of by injecting the water into the earth or evaporating it in lined pits or ponds, both of which are costly and are not environmentally sound, as they essentially are ways to postpone dealing with the contaminants. Thus, both of these have become an increasingly unacceptable disposal method from both environmental and social perspectives. Produced water and flow back water are considered an industrial waste and laws have begun to be enacted requiring producers to recycle this water. Producers also understand that there is both short-term and long-term liability in disposing of contaminated water in disposal wells and evaporation ponds, and recycling would mitigate that liability. Moreover, suitable places for injecting or pits for storing produced water often are not available near the production site. Thus, produced water and flow back water are often shipped tens to hundreds of miles to disposal sites in trucks. In regions where produced water and/or flow back water are being trucked, large numbers of trucks travel over back country roads that are negatively affected by the heavy traffic. Further, the large numbers of trucks are sources of air pollution. In addition, shipping of produced water and flow back water to remote disposal sites is costly, and the sites must be maintained indefinitely. As a hydrocarbon field becomes depleted, the produced water content of the oil or gas increases. This often leads to more fracking and more flow back water. This adds to the cost of recovering oil and gas, just when the return on the wells is dwindling. This can lead to the abandonment of wells that still contain significant amounts of oil or gas.

A further problem with recycling or disposing of the contaminants in produced water is that each source of produced water, flow back water, and water from other industrial sources, such as soy bean oil production and water from ships, is different, which requires that the treatment to decontaminate and recycle it must be different for each well. This makes it prohibitively expensive to recycle produced water and flow back water, so injection and evaporation in pits still remains the primary way of disposing of produced water. For the above reasons, it would be highly desirable if a way to recycle and decontaminate produced water, frack flow back water, and other industrial waters were available that was sufficiently flexible to be able to handle produced water, frack flow back water and other water from a variety of different sources.

BRIEF SUMMARY OF THE INVENTION

The invention solves the above and other problems by providing a water conversion system that produces fresh water, non-contaminated water, and/or potable water from produced water and/or flow back water in fracking processes, and contaminated water in other industrial processes. For example, the system can also be applied to water produced in food processing, such as soy oil production and refining, to cleaning of sea water on ships and oil platforms, and many other contaminated water sources. Since the conversion removes the environmental threat that may come from produced water and frack flow back water, it can be done in areas closer to the sources of produced water and flow back water, so trucking is minimized.

Since hydrocarbons generally come from deep within the earth from areas that were former seas, produced water and frack flow back water inherently have high conductivity due to ions, such as salts. This high conductivity makes it difficult to convert it to useable water. The invention solves this problem with an ability to convert water that has conductivity of 10,000 microsiemens and higher to useable water. It can treat water with conductivities over 50,000 microsiemens and even as high as 100,000 and 200,000 microsiemens. Further, this water is usually very hard, which further complicates the conversion. The invention is able to easily convert water with hardness of 10,000 parts per million and can treat water with hardness of 30,000, 40,000, and even 50,000 parts per million into useable water without difficulty. Produced water and frack flow back water are often very hot. The invention is able to effectively and efficiently treat water that is not only highly conductive and hard, but also well over 100° Fahrenheit.

The water conversion system according to the invention may include an electro-coagulation stage, a coagulation stage, an ultrafiltration stage, a nanofiltration stage, and a reverse osmosis stage. It may also include a forward osmosis stage.

The system according to the invention may be located in a facility along the route of trucks from a number of different contaminated water sources, may be placed on or close to the source of the produced water and frack flow back water, and the water may be either trucked or piped to the system. The transportation of the water to the system may take any appropriate form.

The invention provides a method of processing produced or frack flow back water, the method comprising: recording and verifying the contents of water carried in a plurality of mobile vehicles, each vehicle carrying a load of contaminated produced water or frack flow back water from a hydrocarbon well; discharging the water to a pre-processing basin where it is mixed and homogenized with water from twenty or more of the plurality of vehicles; removing hydrocarbons from the water; processing the water from the preprocessing basin, the processing including: providing an electro-coagulation reactor, an oxidation reactor, an ultrafilter; and a nanofilter; electro-coagulation of water in the electro-coagulation reactor, and oxidizing the contaminants in the water in the oxidation reactor; filtering the water through the ultrafilter and the nanofilter; recycling and/or disposing of contaminants removed from the water in the electro-coagulation, oxidizing, and filtering processes; and recycling the processed water. Preferably, the discharging comprises: off-loading the water from one of the vehicles into a temporary receiving tank; analyzing the off-loaded water and determining that it is suitable for processing; and transferring the water to the pre-processing basin. Preferably, the processing further comprises providing a source point at which potential air pollution gases are removed from the water and further including a recycling system for recycling or using the gases. Preferably, the processing further comprises breaking the flow of water between the electro-coagulator and the nanofilter by flowing it into a first tank. Preferably, the filtering further comprises filtering the water through a reverse osmosis filter after the nanofiltering. Preferably, the processing further comprises performing electrodyalisis on the water after the nanofiltering. Preferably, the recycling of the water comprises adding calcium or magnesium to the water. Preferably, the recording and verifying comprises weighing the vehicles. Preferably, the recording and verifying comprises storing a sample of water from each of the plurality of vehicles. Preferably, the processing further comprises providing a sensor selected from the group consisting of a conductivity sensor, a pH sensor, and a level sensor; and wherein the electro-coagulating comprises providing an electro-coagulation (EC) system comprising: a pulsing system for applying voltage and current pulses to the water, the pulsing system including a modulator for varying the voltage, and current and pulse frequency applied to the water; and controlling the voltage or current using the sensor. Preferably, the sensor includes a flow meter, and the processing further comprises controlling the flow of the water through the EC system using the sensor.

In another aspect, the invention provides a water conversion system for converting water with conductivity of 10,000 microsiemens or more to fresh, non-contaminated, or potable water, the system comprising a source of water having a conductivity of 10,000 microsiemens or more; a pre-treatment system for removing hydrocarbons from the produced water; an electro-coagulation (EC) system comprising a pulsing system for applying voltage and current pulses to the water, the pulsing system including a modulator for varying one or more of the voltage, current, pulse frequency, and time electrical power is applied to the water; an oxidizing reactor; an ultrafilter including an ultrafilter membrane; and a pump for pumping the produced water through the pretreatment system, then through the EC system, then through the oxidizing reactor, and then through the ultrafilter. Preferably, the system further comprises a source point through which potential air polluting gases pass out of the water and a recycling system for recycling or using the gases. Preferably, the oxidizing reactor comprises a first tank creating a flow break between the electro-coagulator and the ultrafilter and wherein the source point comprises a vent on the tank. Preferably, the water conversion system further comprises one or more sensors selected from the group consisting of a conductivity sensor, a pH sensor, and a level sensor for producing one or more sensor signals, and wherein the modulator is responsive to the sensor signals. Preferably, the conductivity is 20,000 microsiemens or more. Preferably, the conductivity is 40,000 microsiemens or more. Preferably, the conductivity is 50,000 microsiemens or more.

In another aspect, the invention provides a water conversion system comprising a computer application for receiving and recording data regarding a plurality of water carrying vehicles and water loads carried by the vehicles, the water loads originating from a plurality of hydrocarbon wells; a water analysis system for determining the quality of water in the water loads and recording the data using the computer application; a scale suitable for weighing the vehicles and providing weight data to the computer application; a storage area for storing samples of water from each of the loads; an equalization basin for storing and homogenizing water from a plurality of the loads originating from the plurality of hydrocarbon wells; and a water processing system for converting water from the equalization basin to fresh, non-contaminated, or potable water. Preferably, the water processing system includes a source point for potential air pollution gases in the water and a system for recycling or using the gases.

In still another aspect, the invention provides a method of doing business comprising providing a water processing facility for converting produced and/or frack flow back water from a plurality of different hydrocarbon wells into fresh, non-contaminated, or potable water; providing a computer application for receiving and recording data regarding a plurality of water carrying vehicles and water loads carried by the vehicles; using the data, creating a vehicle queue; verifying the quality of water in a plurality of the water carrying vehicles and recording the verification data using the computer application; off-loading water from the vehicles at the facility in an order based on the queue and the verification data; using the application, creating a bill of lading for each of the water loads; transferring the off-loaded water to an equalization basin in which a plurality of loads of water from a plurality of water sources are homogenized; removing hydrocarbons from the water; and processing the water to convert it to fresh, non-contaminated, or potable water. Preferably, the method further comprises temporarily storing the water in a receiving tank before transferring it to the equalization basin. Preferably, the method further comprises storing a sample of water from each of the water loads after the water is transferred to the equalization basin.

The water conversion system according to the invention not only converts produced water, frack flow back water, and other contaminated water sources to fresh, non-contaminated, or potable water, it also minimizes the amounts of disposable materials and the amount of trucking. Further, the areas where injection has been practiced are usually remote and arid. The converted produced water and/or flow back water is quite valuable in such areas, which increases the economics of recycling the produced water and/or flow back water. Numerous other features, objects, and advantages of the invention will become apparent from the following description when read in conjunction with the accompanying drawings.

BRIEF DESCRIPTION OF THE DRAWINGS

The above-mentioned features will become more clearly understood from the following detailed description read together with the drawings in which.

DETAILED DESCRIPTION OF THE PREFERRED EMBODIMENT

The invention provides a system and method for converting water, such as produced water and/or frack flow back water from oil and gas production, into fresh, non-contaminated, or potable water. The system also can be applied to water produced in food processing, such as soy oil production and refining, to cleaning of sea water on ships and oil platforms, and many other contaminated water sources. While the system is described in terms of produced and frack flow back water, it should be understood that this is exemplary and the process also can be applied in many other applications.

Figure 1:
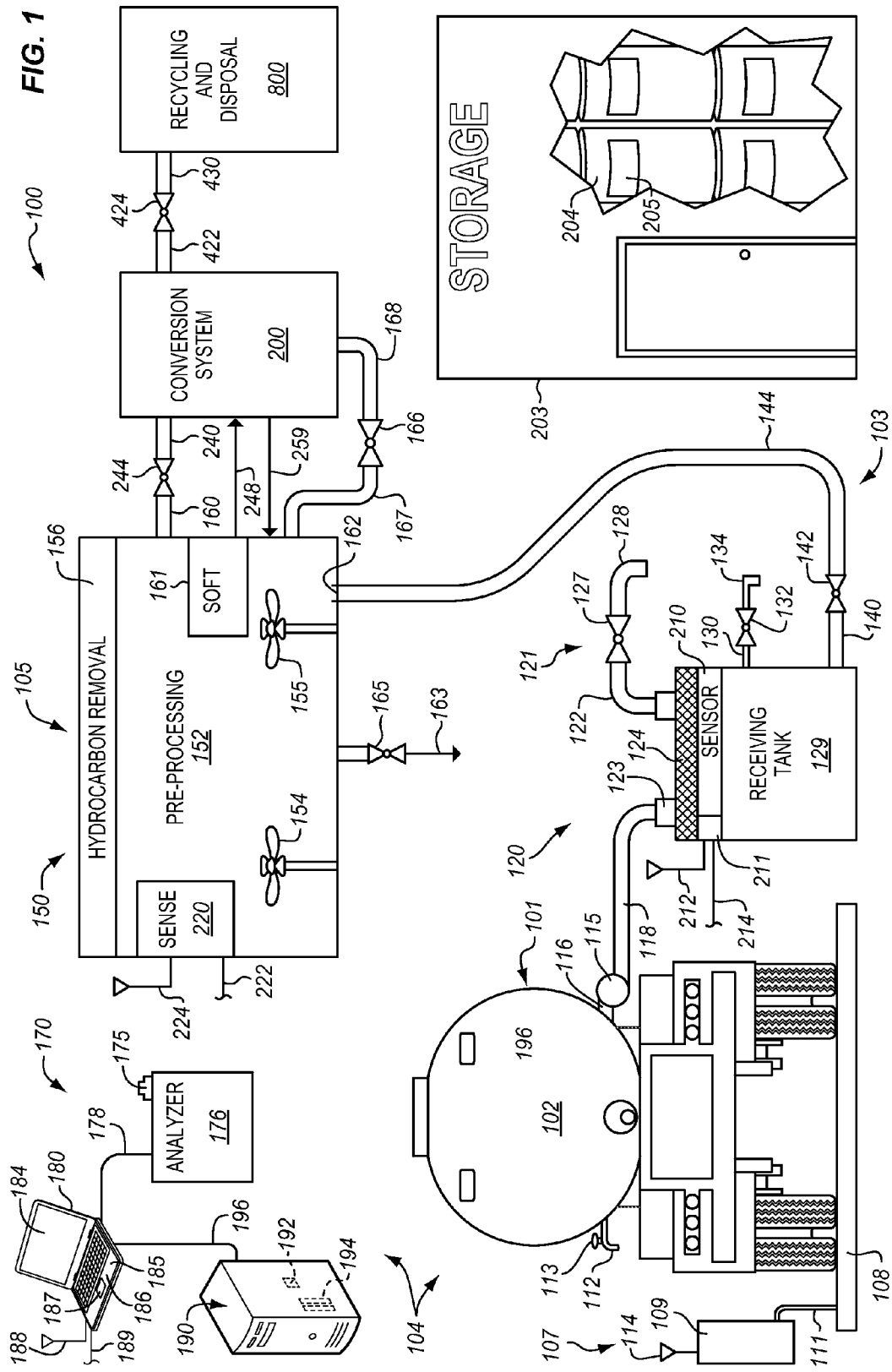
FIG. 1 illustrates a preferred embodiment of the water processing system according to the invention.

A preferred embodiment of such a system 100 is shown in FIG. 1. In the preferred system 100 according to the invention, water is shipped to a receiving and processing station 103 in vehicles, such as 101. However, the water may be supplied directly from hydrocarbon wells, mines, industrial plants, and other sources via pipe systems 121, or otherwise as described in U.S. patent application Ser. No. 13/304,158. In one embodiment, water arrives via pipe 128 and the input is regulated by valve 127 which controls flow into receiving tank 129 via conduit 122. It should be understood that while the preferred embodiment is described in terms of vehicle delivery of processing water, it is not intended to limit the invention to this embodiment. In the preferred embodiment, the vehicles include trucks 101, but may be rail cars or other vehicles. Preferably, the vehicle 101 includes a water tank 102. The receiving station and processing station 103 preferably includes a load registration and verification section 104, a preprocessing section 105, and a water conversion processing section 200. The system 100 also includes a recycling and disposal section 800 that recycles the processed water by selling it and transferring it to vehicles, discharging it to land for agricultural uses, discharging it to surface waters, injecting it to subsurface waters, or storing it. Solids are processed in the disposal section to separate valuable minerals and salts for sale or preparing them for safe disposal.

Fresh water quality is defined as water with a TDS (total dissolved solids) of 750 parts per million (ppm) or less of dissolved salts and 50 ppm or less of suspended solids and a SAR (sodium absorption ratio) of less than 2. Brackish water is defined as water that has at least 500 ppm of dissolved salts. The US Geological Survey (USGS) defines soft water as having 60 mg/l or less of dissolved calcium compounds. Non-contaminated water is defined herein as water that is equivalent to fresh water except that the SAR is 2 or greater. Herein, "soft water" is defined as having 60 mg/l or less of dissolved calcium and magnesium compounds.

The load registration and verification section 104 includes scale 107, water receiving system 120, registration and verification electronics 170, and sample storage area 203. Scale 107 includes a scale platform 108, a scale electronics module 109, an aerial 114 for wireless communication, and cabling 111. The delivery vehicle 101 preferably includes a tank 102, a sampling spigot 112 having a valve 113, and a pump 115 connected to tank 129 via conduit 116 and to temporary storage system 120 via hose 118. Verification electronics 170 includes server 190, analyzer 176, and computer 180. Server 190 includes processor 192 and memory 194. Analyzer 176 includes water port 175 and water analysis unit 176. Computer 180 includes display 184, processor 185, memory 186, an input device 187, such as a keyboard 187, and communication electronics 190 including an aerial 188 for wireless communication. Server 190 is electronically connected to computer 180 via cabling 196, and analyzer 176 is electronically connected to computer 180 via cabling 178. These and other electronic connections herein may be wireless also. Storage area 203 may be a room, cabinet, or other storage system that holds containers 204, each having a label 205 indicating the contents.

Water receiving system 120 includes flow meter 123, filter 124, sensor 210, sensor transmitter 211, aerial 212 and/or cabling 214, receiving tank 129, sample port 130 with valve 132 and spigot 134, and exit port 140 with valve 142 and receiving tank exit conduit 144. Preprocessing section 105 includes a preprocessing basin 152, which may be a tank, a pool, or a pond, sensor electronics 220, which includes an aerial 222 and/or cabling to connect it to verification electronics 170, and hydrocarbon removal system 150. Preprocessing basin 152 preferably includes entrance port 162, exit port 160, and agitators 154, 155 to keep the water in basin 152 homogenized. Produced water and/or flow back water will generally include a variety of hydrocarbons of different densities and weights. Hydrocarbon removal system 150 preferably uses a variety of technologies to separate the hydrocarbons from the water. These technologies will include one or more of the following: gun barrels, skimmers, tube skimmers, paddle and ramp, dissolved air flotation (DAF), hydro-cyclones, centrifuges, and heaters. Skimmers preferably comprise tanks in which water moves slowly, allowing lighter hydrocarbons to float and be removed by a plurality of skimming devices. Tube skimmers comprise a continuously moving surgical hose floating on top of the water, which becomes coated with the hydrocarbons, and then is scraped and put back in the water. Paddle and ramp devices use paddles to push liquid up a short ramp, and then allows the water to flow back while the hydrocarbons fall into a holding tank. DAF uses compressed air in pressurized liquid to make small air bubbles which circulate in the liquid and attach to suspended solids and hydrocarbons, causing them to float. The pressure then is removed, and the water flows to an open tank where the solids are skimmed from the surface of the water. One type of hydro-cyclone system is a device in which the liquid is flowed in a circle while going up and down through a series of baffles. This causes the hydrocarbons to float in a thick layer on top of the water, and this thick layer then can be removed by decanting. For hydrocarbons that have a specific gravity which is very different than water, centrifuges may be used to separate the hydrocarbons and water. Light hydrocarbons can be removed by heating the liquid and/or using air to vaporize the hydrocarbons, which then can be burned in a flare.

Figure 4:
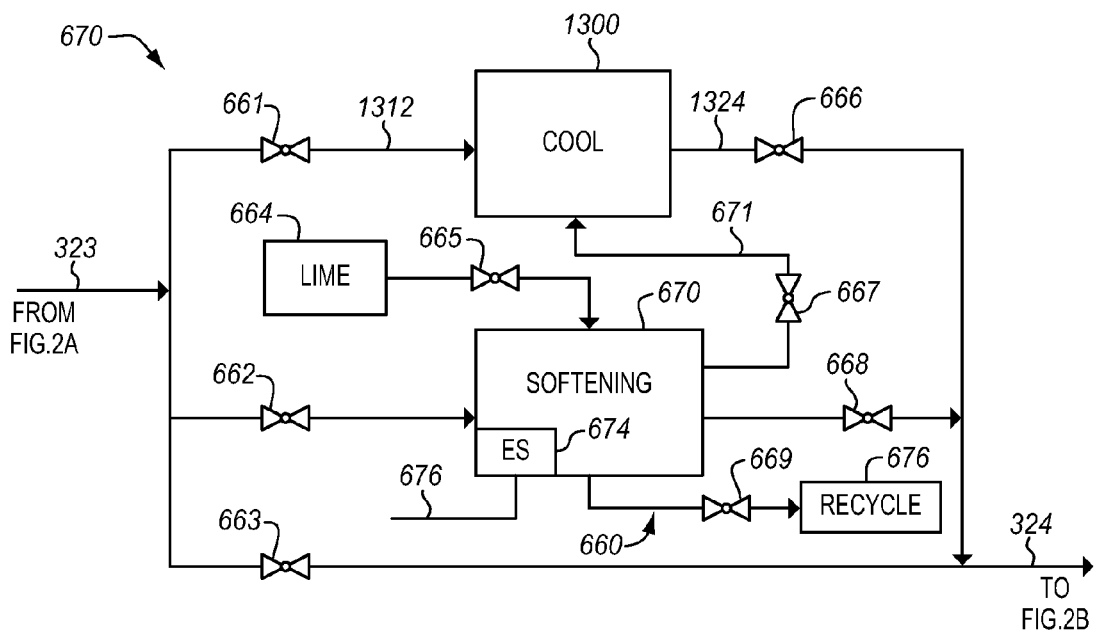
FIG. 4 is a block diagram of a preferred embodiment of a pretreatment system for pretreating water just prior to entering the nanofilter portion of the water conversion system.

Produced water and/or flow back water generally will include elevated hardness levels. The hardness may be removed by softening system 161 in pre-processing system 105. However, electro-coagulation unit 258 can tolerate hardness; and if the hardness is such that it will not scale out in the electro-coagulation or ultrafilter system, the removal of the harness can wait to be removed in nanofilter pre-treat system 670 (FIG. 4). Hardness removal system 161 preferably uses one or more technologies to separate the hardness from the water. These technologies include lime softening, a process of adding lime in the form of $CA(OH)_2$ or soda ash, which reacts first with $CO_2$ to form calcium carbonate precipitate, reacts next with multivalent cations to remove carbonate hardness, then reacts with anions to replace the non-carbonate hardness due to multivalent cations with non-carbonate hardness due to calcium. The precipitate is removed via valve 165 and line 163 where it is directed to a waste disposal or recycling system 801 (FIG. 6) where it can be settled or filtered out of the water or the excess water removed by a dewatering process. Another softening technology that may be used in softener 161 is electronic softening which removes the hardness using electrical or magnetic devices. Water conversion processing section 200 is described below in connection with FIGS. 2A, 2B, and 6, which description is followed by a discussion of recycling and disposal section 800.

Partially processed water from conversion system 200 may be directed to pre-processing system 105 via conduit 168 and valve 166. For example, partially processed water that is highly charged by electro-coagulation system 258 (FIG. 2A) may be delivered to conduit 168 from EC water sampling valve 260, via first tank drain conduit 269 via valve 268, or the concentrate from reject side 291 of ultrafilter 290 may be directed to conduit 168 via conduit 298 and valve 302. Similarly, the waste from reject sides of nanofilter 360 may be directed to conduit 168 via valve 372, waste from the reject side 401 of reverse osmosis filter 400 may be directed to conduit 168 via valve 410, and waste from the concentrate side 447 of ED unit 445 may be directed to conduit 168 via valve 452.

The output port 422 of water conversion processing section 200 is connected to the input 430 of recycling and disposal system 800 via valve 424. The discharge water from the EC or water from the ultrafilter, nanofilter, or reverse osmosis systems that contains charged water can be useful to assist in coagulation and settling of contaminants in pre-processing tank 152, particularly in the case of water highly contaminated with ionic materials. The pre-processing tank 105 also may be connected to conversion system 200 via conduits 248 and 259 which permit specific portions of the conversion system, such as the electro-coagulation unit 250, to be operated in a side stream loop with pre-processing tank 152 if a particular batch of water has a particularly high amount of contaminants on which that portion of the conversion system operates. For example, if a particular batch of water is highly contaminated with ionic contaminants such that it has unusually high conductivity, then it may be useful to lower the conductivity right away using electro-coagulation unit 250. Recycling and disposal system 800 will be discussed in connection with FIGS. 6-9.

In this disclosure, the term "hot" or "heated" means at a temperature of 105° F., or more and very hot water is at a temperature of 120° F. or more. Fresh water quality is defined as water with TDS of 750 parts per million (ppm) or less of dissolved salts and 50 ppm or less of suspended solids. Brackish water is defined as water that has at least 500 parts per million of dissolved salts of suspended solids. The US Geological Survey (USGS) defines soft water as having 60 mg/l or less of dissolved calcium compounds. Herein, "soft water" is defined as having 60 mg/l or less of dissolved calcium and magnesium compounds. Most potable water in the US has a TDS level of 100 to 350 ppm. Herein, "potable water" is defined as water having a TDS level of less than 750 ppm and is safe for humans to drink as defined under the federal Safe Drinking Water Act (SDWA: Pub.L. 93-523; 42 U.S.C. §300 f et seq., Dec. 16, 1974).

Figure 2A:
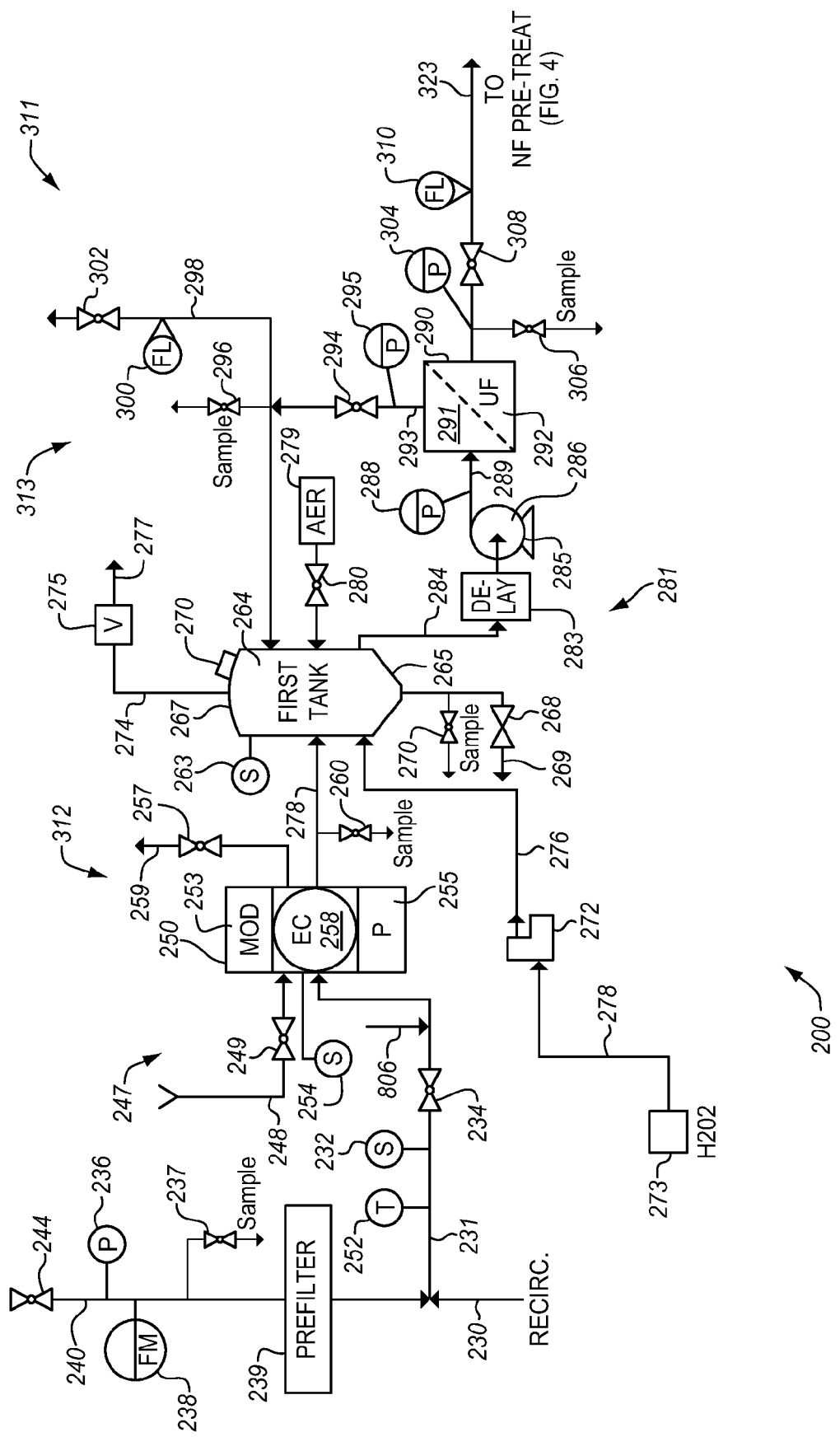
FIGS. 2A and 2B together provide a block diagram illustrating a preferred embodiment of the water conversion system utilized in the system of FIG. 1.
Figure 2B:
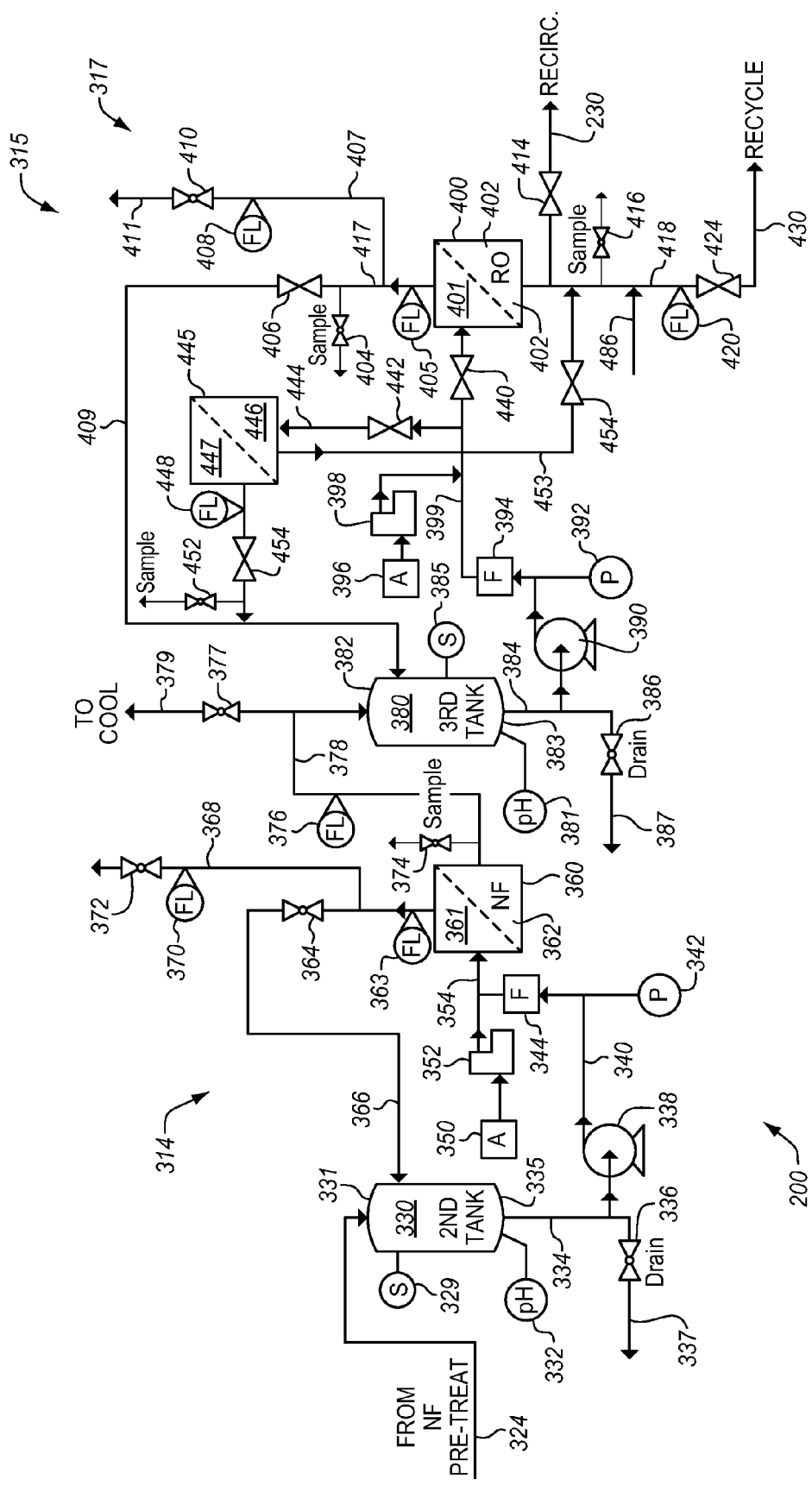

FIGS. 2A and 2B and FIG. 4 together provide a block diagram illustrating the principal parts of the preferred embodiment of the water conversion system 100 utilized in the application of FIG. 1. Other parts of water conversion system 100 are shown in FIGS. 6-10. Water from preprocessing basin 152 (FIG. 1) is input via valve 244 and line 240, which is preferably a hose but may be any other suitable conduit. A pressure gauge 236 measures the input pressure, and a flow meter 238 measures the input flow. The outputs of pressure gauge 236, flow meter 238, and the other gauges discussed herein preferably is communicated to control system 110, which is described in detail in connection with FIG. 3, and preferably also provided to computer 180 and shown on a visible display 184, to provide another level of safety and control. The input water may be sampled via valve 237. A prefilter 239 is connected in the flow path of input line 244. Prefilter 239 is preferably a screen that removes all particles larger than a selected prefilter size, which in the preferred embodiment is 1/32 of an inch or larger, to protect the system 200 from damage. Line 230 is connectable to the outlet of the system (FIG. 2B) to provide the option of diluting the input water with a source of clean water for purposes such as maintaining a desired flow through the system, adjusting the temperature of the input water, or running the water through the system multiple times. Temperature sensor 252 measures the temperature of the water. Sensor 232 is connected to input line 231 and can provide various information to control systems 110 and 170, such as fluid pH and conductivity. Valve 234 controls the flow of water into the electro-coagulator 250 based on the inputs from sensors 252 and 232. Water from dewatering system 802 (FIG. 6) may also re-enter the conversion system 200 via conduit 806 as controlled by valve 804.

Water flow in system 100 continues to electro-coagulation unit 250. Electro-coagulation unit 250 preferably comprises a pump 255, a power drive 253, and coagulation reactor 258. Preferably, power drive 253 is a pulsed drive, and coagulation reactor 258 is a metal hydroxide reactor. The drive 253 varies the voltage and current in a time-dependent manner, creating pulses. Multi-parameter sensor 254 measures the temperature and conductivity in reactor 258. Preferably, the electro-coagulation unit uses high voltage and low current, and the materials that are coagulated and then precipitated in first tank 264 can be varied by varying the voltage. Ionic suspended materials are changed to insoluble forms. Highly charged metal hydroxide species are introduced into the water to neutralize the electrostatic charges on suspended solids, which otherwise tend to make the particles repel each other. The neutralization facilitates coagulation or agglomeration. In one example, the water provided to the electro-coagulation stage 110 typically measures conductivity of approximately 10,000 to 200,000 microsiemens. The water processed by the EC stage, i.e., the permeate leaving the electro-coagulation stage 110, typically measures conductivity of 7,500 microsiemens. Preferably, one or more of the voltage, current, pulse frequency, and time during which the voltage and current are on is determined by the inputs from sensors 252, 232 and 254 and the water flow through the system. The system 250 preferably is controlled to optimize the water flow through the entire converting system 200. It also may also be controlled to maximize ionization in reactor 258 without exceeding temperature and electrical limits of system 250. These two control methods may be equivalent. In embodiment 100, the electro-coagulation unit 250 is an EC Electro-Coagulator Model No. LPR120-2-EC electro-coagulator made by GlobalSep Corporation, 1610 Jefferson Ave., LaGrande, Oreg. 97850, but there may be other suitable electro-coagulators. The output of electro-coagulator 250 flows to first tank 264 via conduit 278, preferably via gravity flow to near the bottom 265.

First tank 264 preferably is made of fiberglass. Samples of the electro-coagulator output may be taken via valve 260. Preferably, first tank 264 is oxygenated. Oxygenation may be provided by a hydrogen peroxide source 273 and feed meter 272 via conduit 276 and/or by an aerator 279 via valve 280. Sensor or sensors 263 preferably is a multiple function sensor or sensors that sense multiple parameters, such as conductivity, pH, salinity, and the level of water in tank 264. Preferably, the oxygen source is the aerator, as this minimizes the addition of chemicals to the water. Gases, primarily volatile organic chemicals (VOCs) that are produced in electro-coagulator 250, notably hydrogen and at times oxygen, as well as $CO_2$, are vented via vent conduit 274, which may be a vent open to the atmosphere, and preferably includes a vent fan 275 or other forced ventilation system which vents VOCs, hydrogen, natural gas, $CO_2$, or other gas via line 277. This provides a single point source for these gases which allows these gases to be controlled and recaptured. First tank 264 preferably includes a hand-hole 270 through which the tank contents may be viewed or accessed. The coagulated solids in the water settle to the bottom 265 of first tank 264, which is preferably cone-shaped to facilitate efficient removal of the solids via valve 268. The effluent from first tank 264 may be sampled via valve 270. First tank 264 provides a hydraulic flow break in that it isolates the flow through first portion 312 of system 100, including electro-coagulation unit 250, from second or ultrafilter stage 313 of system 100, including ultrafilter 290, which is sometimes referred to in the art as a microfilter. The first portion 312 or EC stage 312 of the system 100, particularly electro-coagulation unit 250 and first tank 264, causes the suspended solids to coagulate into flock particles as total suspended solids which settle in tank 264. It not only removes suspended solids to sub-micron levels, but also breaks up emulsions such as oil and grease or latex, and oxidizes and eradicates heavy metals from water without the use of filters or the addition of separation chemicals. System flow proceeds via conduit 284 connected to the side of first tank 264, optionally to a delay system 283, then to ultrafilter pump 286, then to conduit 289.

Delay system 283 provides time for the oxygen or other additives placed into first tank 264 to react with the contaminants in first tank 264. Delay system 283 can take several forms. It may comprise an elongation of conduit 284 which loops back to first tank 264, giving the contaminants and the oxygen a longer time to react, or it may be a plurality of first tanks 264. For example, the latter embodiment may comprise three first tanks 264, one of which is being filled, in one of which the water is idling and the oxygenation reaction is taking place, and one of which is being emptied and the water being passed to ultrafilter 290. First tank 264, sensors 263, peroxide injection system 273 and 272, aerator 279, delay 283, vent 275, and the associated conduits and valves is an oxidizing reactor system 281. Preferably, the combination of the electro-coagulator system 250 and the oxidizing reactor system 281 takes the bulk of the contaminants remaining after the pre-processing out of the water.

The above paragraphs describe the in-line operation of electro-coagulation unit 250. Electro-coagulation unit 250 may also be used in a side stream operation to directly operate on water in pre-processing tank 152, receiving tank 129, or other water storage portions of the system 100. The side-stream components comprise conduits 248 and 259 and valves 249 and 257. The side stream route 247 operates by opening valve 247 to permit water from conduit 248 to pass into EC unit 250. After the water is charged by EC unit 250, it then returns, via valve 257 and conduit 259, to its source, such as pre-processing tank 152, where it coagulates and may be disposed of or recycled, such as via valve 165 and conduit 163 (see FIG. 1).

Each pump in the system, such as 286, includes a variable speed controller, such as 285, which is controlled via control system 110. A pressure gauge 288 is connected to conduit 289 to provide control of the flow to ultrafilter 290. Ultrafilter 290 is preferably a Flowtech™ carbon/silica inorganic 0.01 micron cross-flow filter, but there may be other suitable filters that remove particles of 0.01 micron or larger. Cross-flow filter 290 includes a permeate side 292 and a reject side 191. Reject water exits via conduit 293 and back pressure valve 294 and preferably flows into the first tank 264, preferably into the top 267 of the tank so as to prevent it from stirring up solids. Pressure in reject conduit 293 is monitored via pressure gauge 295. Reject water may be sampled via valve 296. The concentrate from reject side 291 may be directed to an alternate route via conduit 298 and valve 302. In this case, a flow meter 300 monitors the flow of the concentrate. The filtered side 292 of ultrafilter 290 ultimately is passed to second tank 330, also referred to herein as the nanofiltration tank, via conduit 323, though it may be softened and/or cooled first in nanofilter pretreatment system 670 as discussed in connection with FIG. 4 below. The filtered water may be sampled via valve 306 connected to conduit 323. Flow in conduit 323 may be controlled by second tank capacity control valve 308. A pressure gauge 304 and flow meter 310 may be attached to conduit 323 to monitor pressure and flow, respectively. The second portion 313 of system 100, including ultrafilter 290, removes particles up to about 0.01 micron in size, and preferably even up to about 0.03 microns, such as colloidal silica.

The nanofilter 360 and reverse osmosis filter 400 can be more sensitive to hardness and operate better at lower temperatures than electro-coagulation unit 258 and ultrafilter 290. Thus, if the water is particularly hard or excessively hot, the water may be directed through nanofilter pretreatment system 670 as shown in FIG. 4 prior to being passed to the nanofilter 360. The nanofilter pretreatment system comprises valves 661, 662, 663, 665, 666, 667, 668, and 669, cooling system 1300 (FIG. 13), softening system 660, and recycling system 676. Softening system 660 includes softening tank 670, lime feed 669, valve 665, electronic softener 674, and electrical power cable 676. Water in conduit 323 may be passed straight through to second tank 330 in FIG. 2B by opening valve 663 and closing valves 661 and 662. Water may be passed through softening system 660 by closing valves 661, 663, and 667 and opening valves 662 and 668. Water can be passed through cooling system 1300 via conduits 1312 and 1324 by opening valves 661 and 666 and closing valves 662, 663, 667, and 668. Generally, if water is to be softened and cooled, it will be softened first. This may be done by opening valves 662, 667, and 666 while closing valves 661, 663, and 668.

Turning to FIG. 2B, the ultrafiltered water, which also may be softened and/or cooled, is fed to second tank 330 via conduit 324, preferably to the top 331 of the tank. The pH of the contents of second tank 330 may be monitored via a pH sensor 332 attached to the tank. Sensor or sensors 329 is attached to second tank 330 and preferably is a multifunction sensor or sensors that can measure conductivity, the level of water in the tank, salinity, and may sense other parameters. Second tank 330 provides a hydraulic break that isolates the flow through second portion 313 of system 100 and third portion 314 of system 100 that includes nanofilter 360. The water preferably exits second tank 330 via line 334 at the bottom 335 of the tank, which line is connected to nanofilter pump 338. Pump 338 pumps water through conduits 340 and 354 to nanofilter 360. Preferably, a prefilter 344 is connected between pump 338 and nanofilter 360. Preferably, prefilter 344 is a 5-micron filter, the purpose of which is to protect nanofilter 360 from particles that can originate from the inner surfaces of conduits and other parts of the system. A pressure gauge 342 preferably is connected to conduit 340 to monitor the pressure of the water applied to the nanofilter 360. A source 350 of acid, preferably muriatic acid, may be connected to nanofilter input conduit 354 via metering unit 352. The Langelier Saturation Index (LSI) and standards set by the National Association of Corrosive Engineers provide an indicator of the degree of saturation of water with respect to calcium carbonate. In the system 200, and particularly into the nanofilter 360, it is desirable to prevent scaling of membranes by keeping the pH between 6 and 7. If the pH gets too high, acid is added. Nanofiltration (NF) preferably is a cross-flow filtration technology which ranges between ultrafiltration (UF) and reverse osmosis (RO). The nominal pore size of a nanofilter membrane is typically about a nanometer. Nanofilter membranes typically are rated by molecular weight cut-off (MWCO) rather than nominal pore size. The MWCO typically is less than 1000 atomic mass units (Daltons). The transmembrane pressure, i.e., the pressure drop across the membrane, required is lower than the one used for RO, reducing the operating cost significantly. In the preferred embodiment, nanofilter 360 preferably is a cross-flow spiral-wound membrane filter having a reject side 361 and a permeate side 362, though other membrane structures, such as tubular, may be used. In the preferred embodiment, a Hyrdanautics™ membrane housed in a Code Line™ housing is used. The reject or concentrate water is directed back to second tank 330, preferably to the top 331 of the tank, via conduit 366. The flow from nanofilter reject side 361 may be monitored by a flow meter 363 attached to conduit 366. A back pressure valve 364 may be used to control back pressure in conduit 366. The reject or concentrate from nanofilter 360 may be directed to an alternate route via conduit 368 and valve 372. The flow in conduit 368 may be monitored with flow meter 370. The conductivity of the contents of second tank 330 may be adjusted via drain 336 and/or valve 372. That is, the reject water from nanofilter 360 will generally have a higher conductivity than the water coming from ultrafilter 290. By partially draining second tank 330 or by venting water from the nanofilter 360, the conductivity may be controlled. A feature of the invention is that this draining or blow-down of second tank 331 is small. Preferably, the blow-down of second tank 331 is less than 10% of the water that enters the tank, more preferably, less than 7%, and most preferably less than 5%. The third portion 314 of system 100, including nanofilter 360, removes most particles up to about 0.004 microns in size, including aqueous salts and some, though not all, metal ions.

The permeate side 362 of nanofilter 360 is connected to third tank 380, also referred to herein as the reverse osmosis tank, via conduit 378, preferably to the top 382 of third tank 380. Conduit 379 is connected to the nanofilter permeate conduit 378 via valve 377. Conduit 379 feeds nano-filter permeate water to the processing water of cooling tower 460, for reasons to be described further below. Nanofilter permeate may be sampled via valve 374, and the flow of the permeate may be monitored via flow meter 376 attached to conduit 378. The pH of the contents of third tank 380 may be monitored via a pH sensor 384 attached to tank 380. A multifunction sensor or sensors 385 measure conductivity, salinity, and the level of water in the tank, and may measure other parameters. Third tank 380 provides a hydraulic break that isolates the flow through third portion 314 of system 100 from that of fourth portion 315 of system 100 that includes reverse osmosis filter 400 and may include electrodyalisis (ED) unit 445. Water exits tank 380 via conduit 384 connected to pump 390. A drain valve 386 also is connected to exit conduit 384. The water is pumped to fourth portion 315 via conduit 399, and preferably through filter 394 connected into the conduit. Depending on the salt concentration in third tank 380, the water is directed either through ED unit 445 via valve 442 or through RO filter 400 via valve 440. Filter 394 preferably is a 5-micron filter, which protects the ED unit 446 and the reverse osmosis membrane from particles that can originate from the inside of conduits, pumps, etc. The pressure in conduit 399 preferably is monitored via a pressure gauge 392 connected to the conduit. Preferably, a source of acid, preferably muriatic acid, is metered to conduit 399 by meter 398. We shall first discuss the alternative in which the water from third tank 380 is directed through reverse osmosis filter 400 and then discuss the alternative in which the water from tank 380 is directed through ED unit 445.

Reverse osmosis filter 400 preferably is a spiral wound cross-flow filter, preferably a Hydranautics™, FilterTec™, or Koch™ filter. The reject or concentrate side 401 of filter 400 preferably is directed via conduits 417 and 409 to third tank 380, preferably to the top 382 of the tank. Back pressure valve 406 may be connected to conduit 417 to permit control of the pressure in filter 400 and the flow into conduit 409. The flow may be monitored via flow meter 405, and the reject concentrate from RO filter 400 may be sampled via valve 404.

In the alternative in which water from third tank 380 is passed through ED unit 445 via valve 442 and line 444, the concentrate from side 447 of ED unit 445 is passed to line 409 via valve 454 and thence back to tank 380. A flow meter 448 measures the flow, and the flow may be sampled via valve 452. The diluate from diluate side 446 of ED unit 445 passes through line 453 and valve 454 to line 418.

The permeate from side 402 of RO filter 400 or the diluate from ED unit 445 is passed to recycling system 800 (FIGS. 1 and 6) via conduit 418. A flow meter 420 preferably is connected to conduit 418 to measure the flow of clean water. The flow may be controlled via valve 424 and may be sampled via valve 416. Alternatively, the flow of clean water may be partially or fully directed to recirculate through the system 100 via conduit 230, valve 414 connected along the conduit, and valve 424.

Another alternate route for the RO concentrate may be provided via conduit 407, valve 410, and conduit 411. Flow meter 408 may be connected to conduit 407 to monitor the flow through the conduit. In this alternative, a separate dewatering recycling/disposal system 841, discussed below, is used to recycle the water and dispose of any solids.

The fourth portion 315 of system 100, including reverse osmosis system 400 and ED unit 445, removes all remaining dissolved solids, such as aqueous salts and metal ions, leaving the water with the quality of fresh water or at least non-contaminated water.

Figure 3:
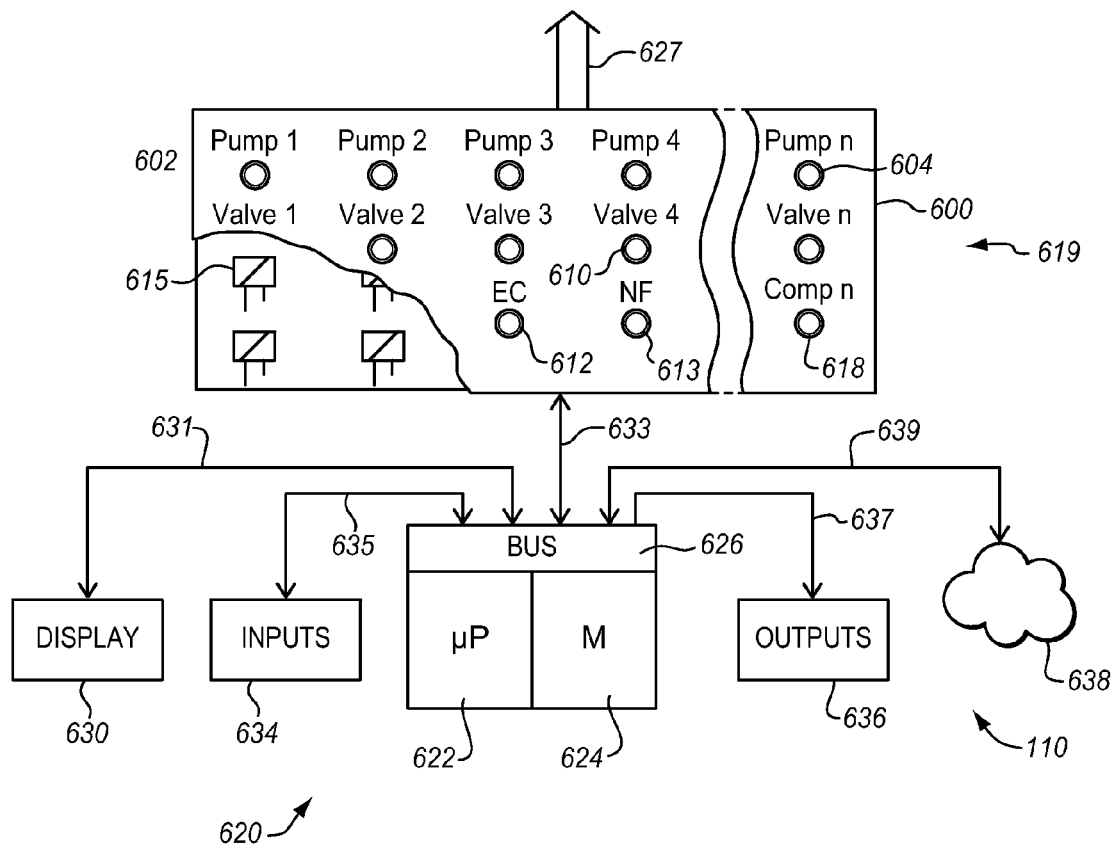
FIG. 3 is a partially cut-away plan view of the control system for controlling the operation of the water conversion system of FIGS. 2A and 2B.

FIG. 3 is a partially cut-away plan view of the control system 110 for controlling the operation of the water conversion system 100. Control system 110 comprises manual control system 619 mounted on a control panel 600 and computer 620. Manual control system 619 preferably comprises switches, such as 602, 604, 610, 612, 613, and 618 to turn on and off the fans, pumps, valves, meters, electro-coagulator, filters, and other devices of the system. Each switch preferably is a push button switch; and each switch operates a relay, such as 615. Manual control panel 600 communicates with the various motors, etc., of the system via electrical cables 627. Computer 620 is connected to control panel 600 via electrical connection 633, and preferably includes microprocessor 622; memory 624; bus 626; input devices 634, such as a keyboard, mouse, gauges, sensors, meters, etc., connected to bus 626 via electrical connection 635; output devices 636, such as one or more printers, meters, variable speed pump controllers, etc., connected to bus 626 via electrical connection 637; and a display 630 connected to bus 626 via electrical connection 631. Computer 620 may also be connected to the Internet 638 or other LAN via electrical connection 639. The electrical connections 631, 633, 635, 637, etc., may be cables or wireless.

Figure 5:
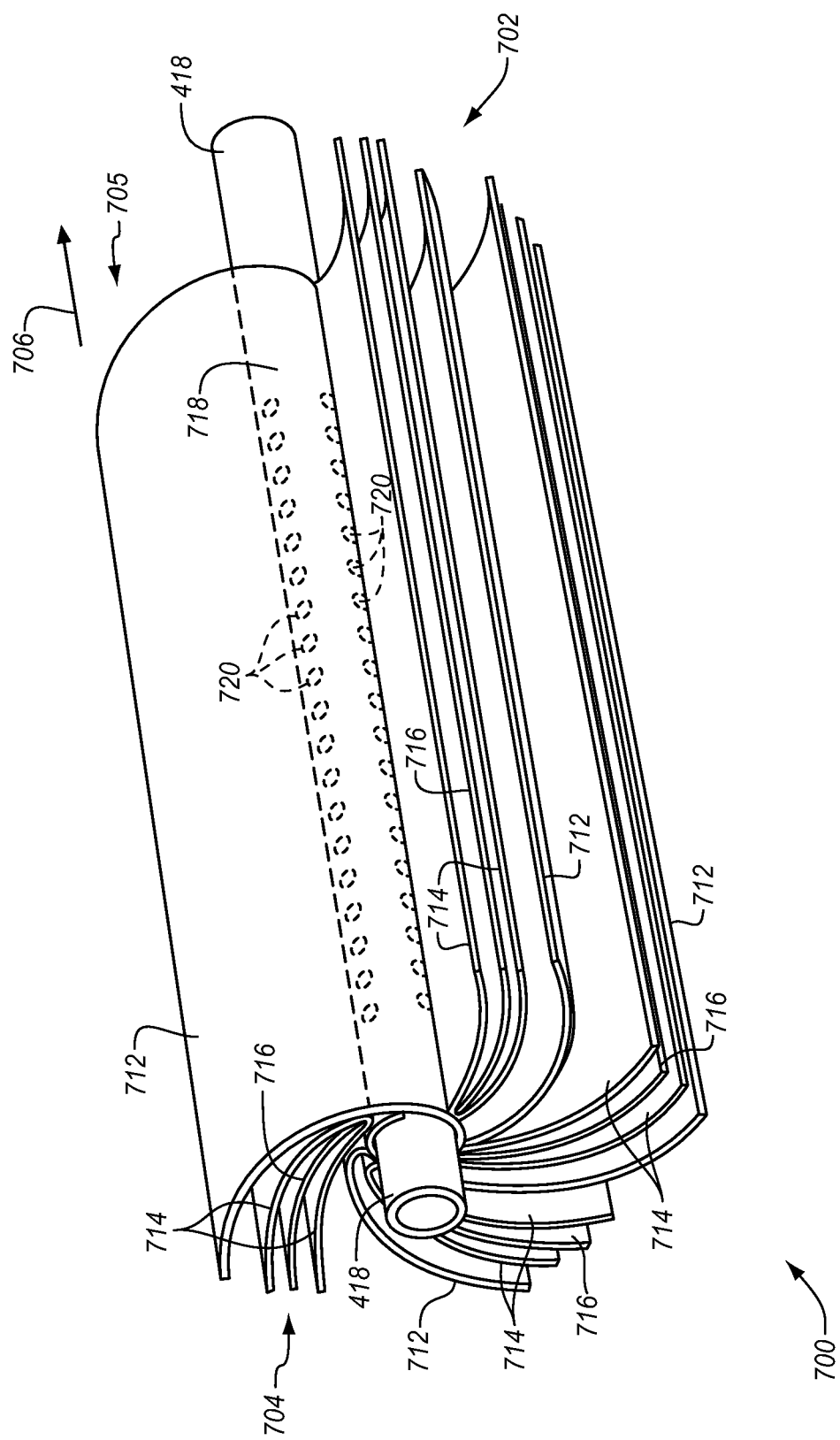
FIG. 5 is a partially cut-away perspective view of an exemplary reverse osmosis unit of FIG. 2B.

FIG. 5 is a partially cut-away perspective view of the nanofiltration and reverse osmosis cartridge 702. The nanofiltration cartridge is enclosed in housing 361, while the reverse osmosis cartridge is enclosed in housing 401 (FIG. 2B). Both the nanofiltration and reverse osmosis systems preferably utilize a spiral wound cartridge, with the reverse osmosis cartridge having a finer filter membrane. Preferably, the membranes are made of a polymer. Cartridge 702 preferably comprises a plurality of layers 712, 714, and 716 wrapped around a collector 718 which is perforated with holes 720. Layer 712 preferably is a permeable carrier membrane, layer 714 preferably is a permeable reverse osmosis membrane, and layer 716 is a feed carrier. Water enters the cartridge from conduit 399 (FIG. 2B) in the direction 704 through feed carrier 716, passes through reverse osmosis membrane 714, enters carrier membrane 716, and flows through the carrier membrane toward holes 720. The water that passes through nanofiltration or reverse osmosis membrane 714 is collected in collector 718 and passes into conduit 418. Reject water that does not pass through reverse osmosis membrane 714 flows out the end 705 of the cartridge in the direction 706, is collected, and passes into conduit 417. Typically, particles ranging in size from less than 0.001 microns up to nearly 0.01 microns are removed from the water via nanofiltration, and smaller particles are removed from the water via reverse osmosis.

Figure 6:
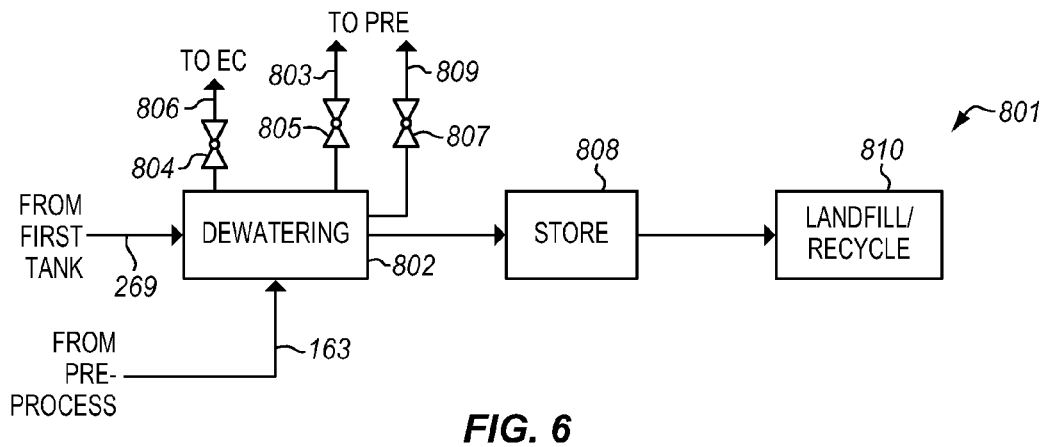
FIG. 6 is a block diagram illustrating a portion of the recycling and disposal system of FIG. 1 which is utilized for recycling and disposing of the electro-coagulation and ultra-filtration reject.

FIG. 6 is a block diagram illustrating a portion 801 of the recycling and disposal system of FIG. 1 which is utilized for disposing of the electro-coagulation and ultrafiltration reject via conduit 269 or precipitants from pre-processing system 105 via conduit 163. System 801 includes a dewatering stage 802, a storage stage 808, and a landfill or recycling stage 810. Dewatering stage 802 preferably is a filter press or centrifuge, but may be any other dewatering device such as an evaporator. In the preferred embodiment, the waste from first tank 265 is a sludge having about 20 percent solids. Preferably, this is dewatered sufficiently to get it down to between 20 percent and 30 percent solids to land fill it. At this percentage of solids, it is wet dirt, as compared to 40 percent to 50 percent solids which is dry earth. Line 269 is connected to the bottom of first tank 264 as discussed above. The contents of the tank are continually being concentrated by the fact that the content cycles through the ultrafiltration unit 290 as discussed above. When sensors 263 attached to the first tank indicate that the concentration is appropriate for disposal, valve 268 is opened and the contents of first tank 264 pass to dewatering stage 802. The material that results is a sludge, or silt, that is similar to wet soil. The sludge is accumulated in storage area 808, and then either placed in a landfill or recycled. The water that is removed in a filter press or centrifuge may be returned to the EC via valve 804 and conduit 806. If it originated from the EC or first tank 264, it will usually contain charged particles; thus, it may also be usefully returned to preprocessing system tank 152 via conduit 168 and valve 166 where it can assist in precipitating out ionic material. Both the distillate side of dewatering system 802 and the solids side of dewatering system 802 may contain charged ions and thus, depending on the content of pre-processing tank 152, either of these could be useful in funneling to conduit 168 to assist in pretreatment. The distillate may be fed to conduit 168 via valve 805 and conduit 803. In an alternative where the solids may be useful in assisting in precipitating the content of pre-processing tank 152, the "solids" may be fed to conduit 168 via valve 807 and conduit 809. If the water to be dewatered originated from pre-processing system 105, particularly hardness precipitants, it often is comprised mainly of carbonates which can be recycled as an alkali soil conditioner.

Figure 7:
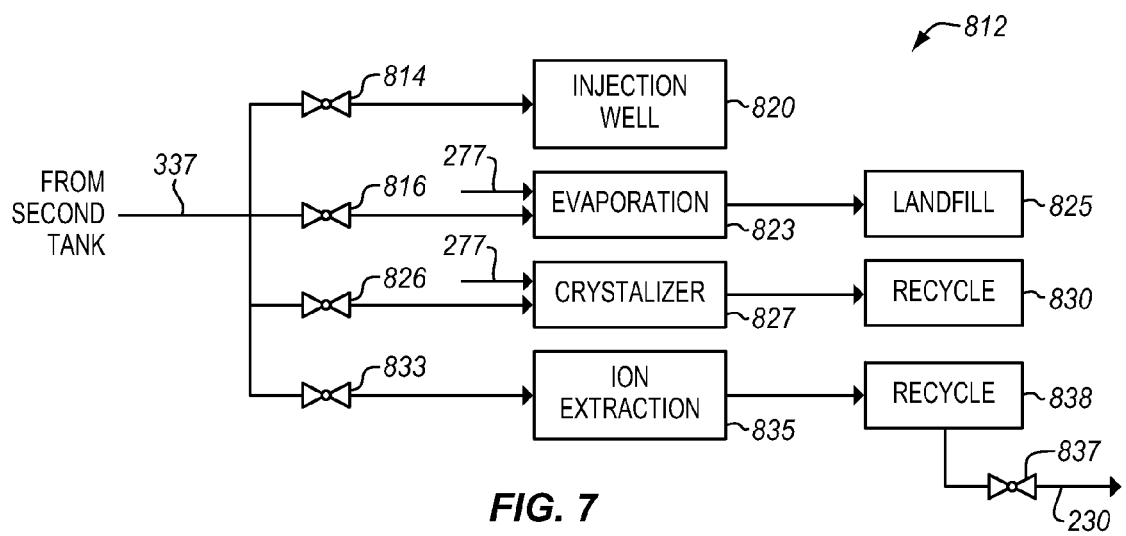
FIG. 7 is a block diagram illustrating a portion of the recycling and disposal system of FIG. 1 which is utilized for disposing of the nanofiltration reject.

FIG. 7 is a block diagram illustrating a portion 812 of the recycling and disposal system of FIG. 1 which is utilized for disposing of the nanofiltration reject. Nanofiltration recycling and disposal system 812 preferably includes valves 814, 816, 826, 833, and 837, an injection well 820, an evaporator 823, a landfill system 825, a crystallizer 827, an ion extraction unit 835, and recycle systems 830 and 838. The recycled water may be returned to the processing system 200 via valve 837 to line 230 (FIG. 2A). Line 337 connects to the outlet of second tank 331, as discussed above. When sensors 329 attached to the second tank 330 indicate that the concentration is appropriate for disposal, valve 336 is opened and the contents of second tank 330 is directed via valves 814, 816, 826, and 833 to the appropriate one of injection well 820, evaporator 823, landfill system 825, crystallizer 827, or ion extraction unit 835. Line 277 connects to vent 275 in first tank 264 and provides gases which can be burned to provide heat in evaporators 823 and/or 848 and crystallizer 827. The point at which the waste is removed is determined by conductivity and is based on the Langelier Saturation Index (LSI). The reject in second tank 330 comprises ionic materials such as metals. Thus, if injection is selected, it is deep injection where the materials will not make it into surface or usable water. However, preferably, it is evaporated via evaporator 823 or crystallized via crystallizer 827. What remains after evaporation is a small quantity that is suitable for landfill 825. Crystallized materials may be useful and, if so, are recycled. The nano reject materials can contain valuable metals or other ions and, if so, these may be extracted in ion extractor 835 and recycled by selling appropriately.

Figure 8:
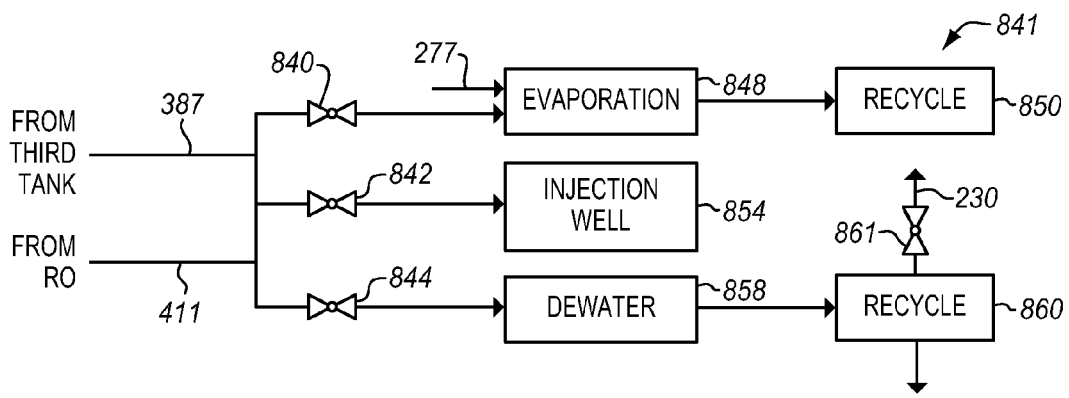
FIG. 8 is a block diagram illustrating a portion of the recycling and disposal system of FIG. 1 which is utilized for recycling and disposing of the reverse osmosis reject.

FIG. 8 is a block diagram illustrating a portion 841 of the recycling and disposal system of FIG. 1 which is represents one alternative for disposing of the reverse osmosis reject. Water preferably is directed to portion 841 either from third tank 380 via line 387 or from RO unit 400 via line 411. At either point, the water is free from organics; and any contaminants that remain are metal salts or, in some cases, metals. The concentration of these materials coming right off lines 387 and 411 makes the water not much different than the deep water in many areas where oil is found. Thus, injection often is the preferred means of disposal. If the concentration is higher, then evaporation or dewatering is preferred as, at these concentrations, the solids often are salvageable for sale. Valves 840, 842, and 844 direct the water to the appropriate one of evaporation unit 848, an injection well 854, or dewatering system 858. From evaporator 848, the water is recycled in system 850; and from dewatering system 858, the solids are recycled via system 860. The recycled water may be returned to the processing system 200 via valve 861 and line 230 (FIG. 2A). Because the reject materials after nano filter 360 mostly comprise sodium chloride, the materials remaining after evaporation or dewatering can be sold directly or used as raw feed for a process for making valuable materials, such as sodium hyper chlorite or sodium chlorite. Injection into deep wells via 854 also is feasible in many areas where deep water is highly salty and an injection does not alter the water appreciably. In particular, brine from the RO unit 400 is useful in preparing drilling mud, for example, ten-pound drilling mud. Dewatering system 858 may be a filter press or centrifuge, but preferably is an electrodyalisis system such as shown in FIG. 10.

Figure 9:
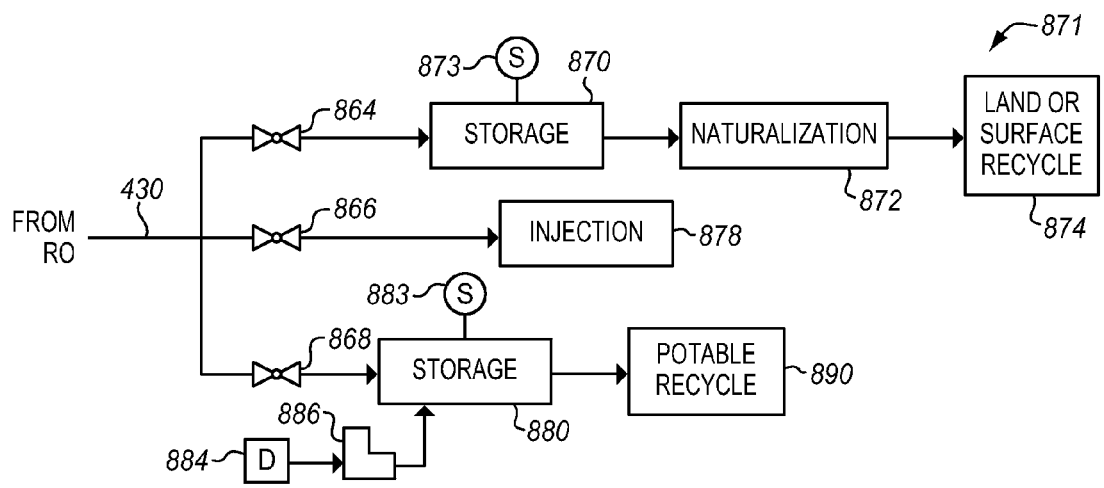
FIG. 9 is a block diagram illustrating a portion of the recycling and disposal system of FIG. 1 which is utilized for recycling converted water.

FIG. 9 is a block diagram illustrating a portion 871 of the recycling and disposal system of FIG. 1 which is utilized for recycling converted water. Water recycling system 871 preferably includes valves 864, 866, and 868, storage system 870 having sensor 873, naturalization system 872, water recycling system 874, injection system 878, potable water storage system 880 having sensor 883, disinfectant source 884, disinfectant meter 886, and potable water recycling system 890. The permeate water from reverse osmosis unit 400 is generally directly usable. If the water is to be used for agriculture use or discharged to surface waters, it is directed to storage unit 870. The output of sensor 873 is used to determine if any adjustment is required to match the water to its use. For example, the water may be too pure. That is, it may be lacking certain elements that are in natural water. If so, these chemistries are adjusted in the naturalization unit 872. For example, for the water to be satisfactory for drinking and/or agriculture, it may be necessary to adjust the Sodium Adsorption Ratio (SAR). SAR is a measure of the suitability of water for use in agricultural irrigation, as determined by the concentrations of solids dissolved in the water. It is generally calculated as a ratio of sodium to calcium and magnesium. If the SAR is too high, then the naturalization unit 872 adds calcium or magnesium to lower the SAR. For example, naturalization unit 872 may contain gypsum which, if added to the water, will lower the SAR. If the water is to be sold or used as potable water, it is directed to potable water storage unit 880. As determined by sensor 883, suitable amounts of a disinfectant, such as chlorine, may be metered into storage unit 880 via meter 886. The water then is recycled via bottling, tanker, or piper transport, or directed into municipal water supplies via potable recycle unit 890.

Figure 10:
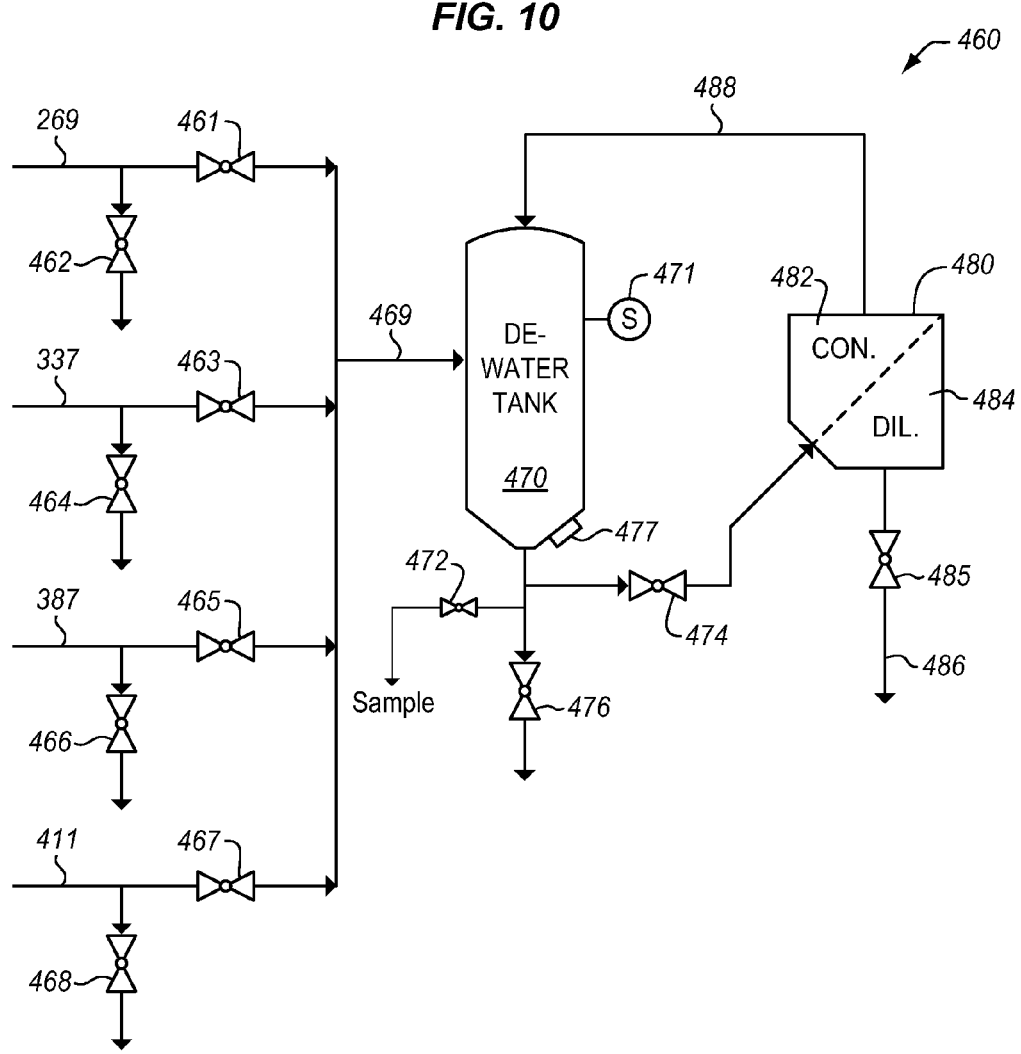
FIG. 10 is a block diagram of one embodiment of a dewatering system 460 as may be used in the system 801 of FIG. 6, the system 812 of FIG. 7, and/or the system 841 of FIG. 8.

FIG. 10 is a block diagram of one embodiment of an electrodyalisis system 460 as may be used in the system 801 of FIG. 6, the system 812 of FIG. 7, and/or system 841 of FIG. 8. Electrodyalisis system 460 may be connected to line 269 (FIG. 2A), line 337, line 387, or line 411 (FIG. 2B). The contents of lines 269, 337, 387, and 411 may be sampled via valves 462, 464, 466, and 468, respectively; and their connection of the lines into electrodyalisis system 460 is controlled via valves 461, 463, 465, and 467, respectively. Water from the selected source is passed into dewatering tank 470 via line 469. The salinity, pH, and other parameters of the contents of tank 470 are sensed via sensor 471. The contents may be sampled via valve 472, and the tank may be drained via valve 476 or accessed via entry port 477. The water in tank 470 is cycled through ED unit 480, having concentrate side 482 and diluate side 484. The concentrate is passed back to tank 470 via line 488, and the diluate is recycled via valve 485 and line 486, such as by connection of conduit 486 to conduit 418 (FIG. 2B). Having a dedicated dewatering tank 470 associated with ED unit 480 allows the reject from either first tank 264, second tank 330, third tank 382, or RO reject side 401 to be separated from the flow of processing system 200 and further concentrated without detracting from the flow of water through the system. Sensors 263, 329, and 385 are used to determine when the water should be directed out of the flow of processing system 200 into ED system 460, or any of systems 801, 812, and 841. This makes the system 200 flexible and efficient, allowing it to efficiently process a wide variety of different water from a wide variety of hydrocarbon wells.

Figure 11A:
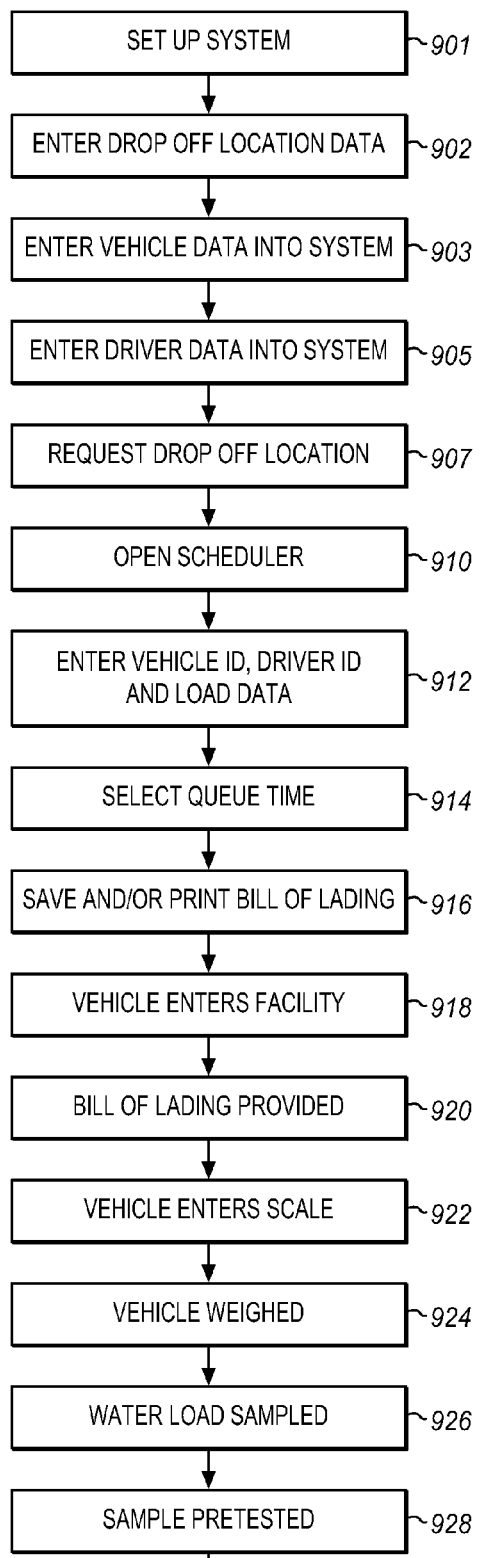
FIGS. 11A and 11B together provide a flow diagram illustrating a preferred embodiment of the water processing method according to the invention.
Figure 11A:
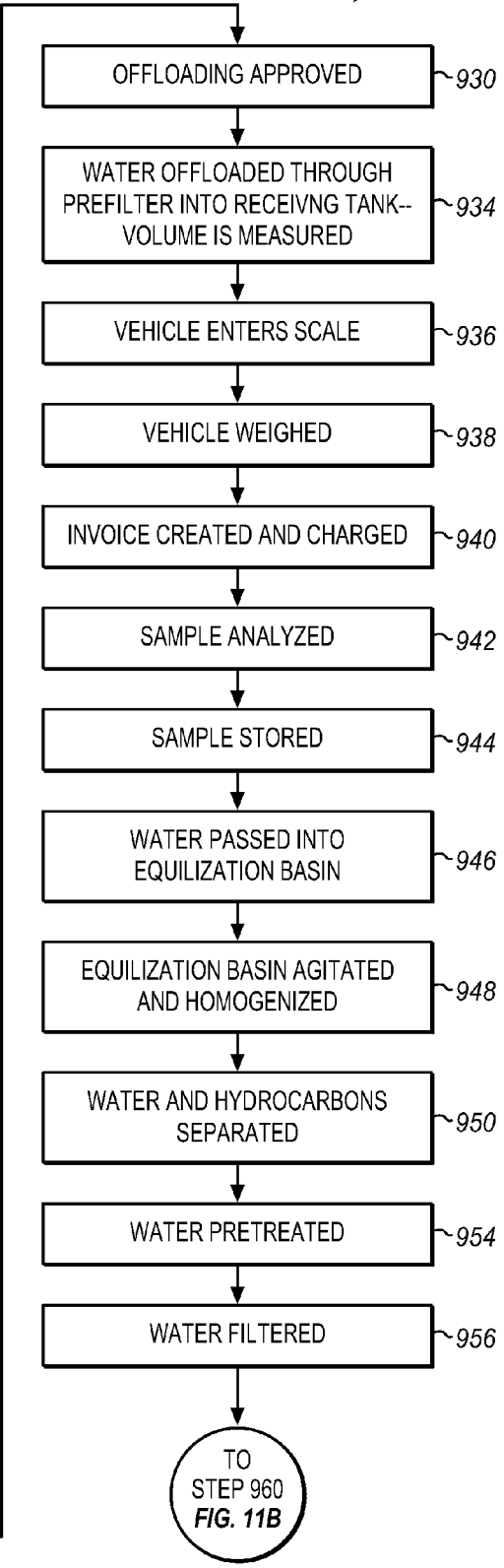
Figure 11B:
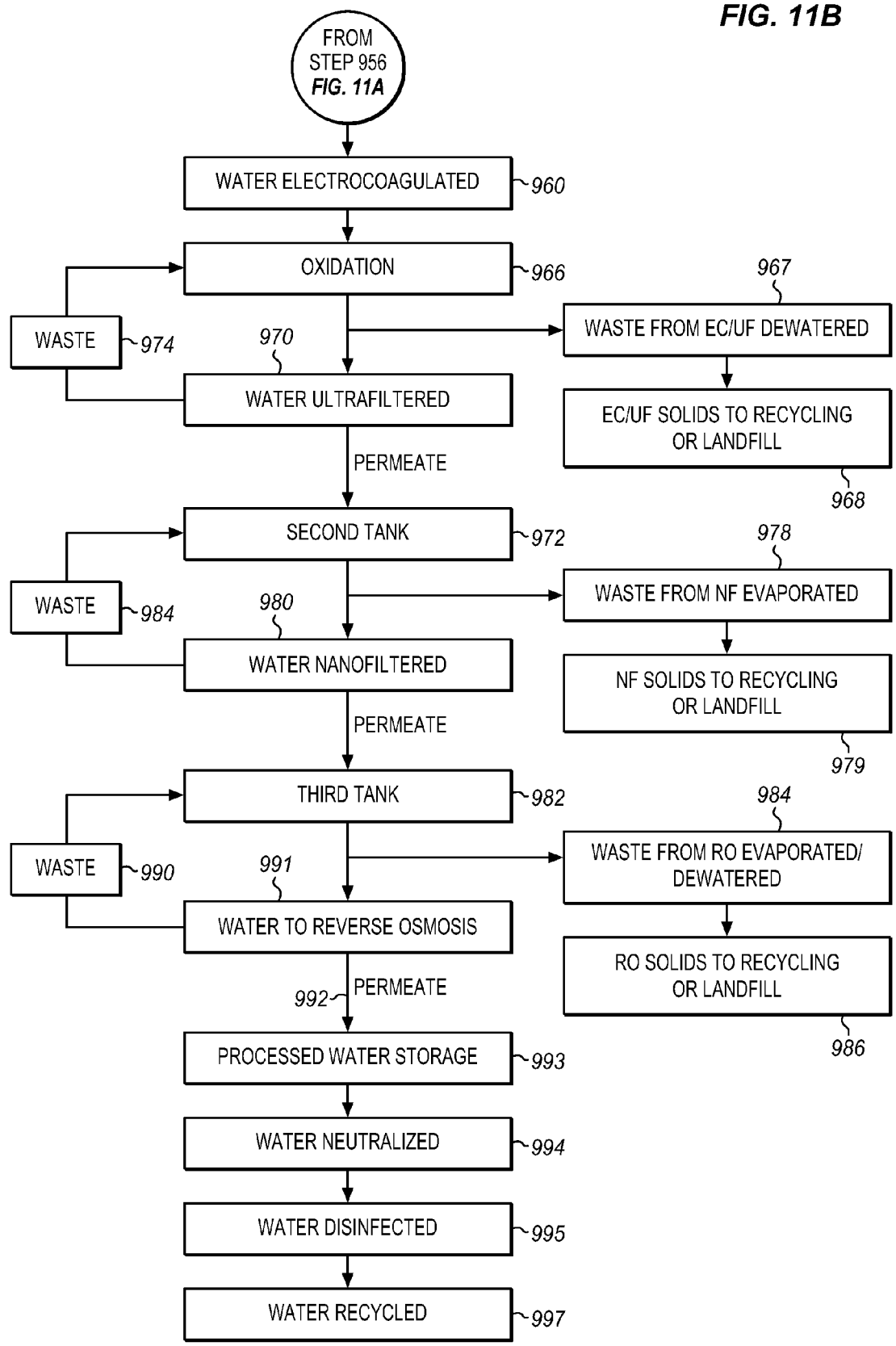

FIGS. 11A and 11B together provide a flow diagram illustrating some processes of a preferred embodiment of the water processing method according to the invention. At step 901, a computer program that manages the system is set up. In step 902, system parameters, such as drop off location data, are entered and stored in server 190. Then either at the receiving and processing station 103, via computer 180, remotely through a computer connected to a web site, via a smart phone, or other data entry device, a user enters vehicle data into the system at 903, and driver data is entered at 905. The driver requests a drop off location and time at 907. Preferably, both the driver and vehicle are given an identification (ID) code. This data is stored in server 190 and may be accessed as needed. A user who desires to drop off a load enters the system, either at the receiving and processing station 103, via computer 180, remotely through a computer connected to a web site, via a smart phone, or other data entry device, and requests a drop off location. A scheduler in the computer program is opened at 910. The user enters a vehicle and driver ID and load data at 912, including the source of the produced water and/or flow back water and volume, and selects an off-load time in the station queue at 914. A bill of lading that includes the vehicle and driver information, the load information, queue position and time, and, preferably, an estimated cost, are saved and preferably printed at 916.

The queue position is determined by a number of factors, one of which is the time the driver would like to off-load. However, the system also considers the source of the load and its volume. Produced water and/or flow back water from different sources will have different properties. For example, the conductivity of the water may vary widely, from 2000 microsiemens to 200,000 microsiemens. Loads are queued to keep the equalization basin 152 at a conductivity level appropriate to keep the electro-coagulator 258 operating efficiently. The pulse sequence and amplitude of the electro-coagulator will be different for different conductivities; and if conductivity is jumping wildly, it is more difficult to keep the conversion system 200 balanced. Similarly, properties such as the pH and turbidity preferably are balanced by adjusting the queue.

At the designated queue time, the vehicle enters the facility 103. The vehicle is driven onto scale 108, and the vehicle weight is transmitted to computer 180. The vehicle enters the proper facility at 918 where a bill of lading is provided and checked against the vehicle and driver at 920. Then the vehicle enters the scale at 922 and the vehicle is weighed at 924. The water load is sampled at 926. The sample is pretested at 928 and, if the pretest is within designated parameters, offloading is approved at 930. At 934, water is offloaded and passed through prefilter 124 into receiving tank 129. The volume is measured by flow meter 123. The vehicle re-enters the scale 108 at 936, and the vehicle is weighted again at 938. The data is transmitted via transmitter 211 to computer 180 and stored in server 190. An invoice is created and charged at 940.

During offloading or any time thereafter, a sensor 210 may detect any property of the water that may compromise the water conversion system 200. A sample is removed from the receiving tank and analyzed on analyzer 174 at step 942. The analysis may include laboratory tests also. At 944, the sample is stored. The storing of the sample enables it to be checked if problems with the load later develop. For example, if unsafe chemicals appear anywhere in the system 100, the storing of the sample will allow where the chemicals came from to be determined and proved. At step 946, after the content of the load has been definitely determined, the load is passed into equalization basin 152. The equalization basin is agitated and homogenized at 948. Different loads will have different parameters, some of which may be outside the optimum range for the conversion system 200. On the average, though, loads will be within well-defined parameters. The equalization basin 152 allows loads that may spike in one direction or the other to be equalized by mixing with other loads. The process here is to put everything from different trucks in the basin 152 to get a single "brew" that, on the average, has consistent properties and does not spike away very much from the average. For example, a typical truck carries about 5040 gallons, i.e., a standard truck can carry 130 barrels but, in fact, carries only about 120 barrels because of the weight of solids. At 42 gallons per barrel, this equals 5040 gallons. If the basin 152 is on the order of a million gallons, and a truck adds 6000 gallons, at most a single truck can only change the properties of the equalization basin by a half percent. Moreover, trucks are checked individually to make sure they are not carrying something the system 100 cannot handle. At 950, water and hydrocarbons are separated in hydrocarbon removal system 150. The water in equalization basin 152 may be pretreated in step 954. The water then enters conversion system 200.

At step 956, the water is prefiltered in prefilter 239. It is then electro-coagulated in step 960. Electro-coagulation is more efficient when the water is hot, i.e., over 100° F. However, if the water is not hot, the same result can be obtained by using more power in the electro-coagulator 258. Since heating the water uses power also, it is usually simpler and preferable to use the energy that would be used in heating the water to increase the power of the electro-coagulator. At 966, it is directed to oxidation reactor 281 where the contaminants as transformed by electro-coagulator 250 are oxidized and the suspended solids and the products of the electro-coagulation and oxidation reactions settle out. Waste from the first tank 264 may be dewatered at 967 and either recycled or delivered to a landfill at 968. The upper level water in tank 264 is ultrafiltered at step 970. Ultrafilters typically work better if the water is heated. However, by increasing the pressure, the same result can be obtained that could be obtained by heating the water. The waste from the ultrafilter is returned to the first tank 264 at 974 while, at 972, the permeate is directed to the second tank 330. The water from the second tank 330 is nanofiltered in nanofilter 360 at 980, with the waste passing back to the second tank 330 at 984 and the permeate passing to the third tank 380 at 982. The content of the second tank 330, i.e., the waste from the nanofilter, is evaporated or dewatered at 978, and the nanofilter solids are recycled or sent to a landfill at 979. The water from the third tank 380 is passed through reverse osmosis unit 400 at 991, with the waste going back to the third tank 380 and the permeate at 992 optionally sent to processed water storage at 993. The water from the third tank 380, i.e., the waste from the reverse osmosis filter, is evaporated or dewatered at 984, and the reverse osmosis solids are recycled or sent to a landfill at 986. The processed water may be naturalized at 994 and/or disinfected at 995, then it is recycled at 997. One or more of the steps of storage, naturalization, and disinfecting may be skipped and the water directly recycled. The various sub-processes described above can be performed in a different order, one or more sub-processes can be skipped, or additional sub-processes may be combined with the sub-processes described.

Figure 12:
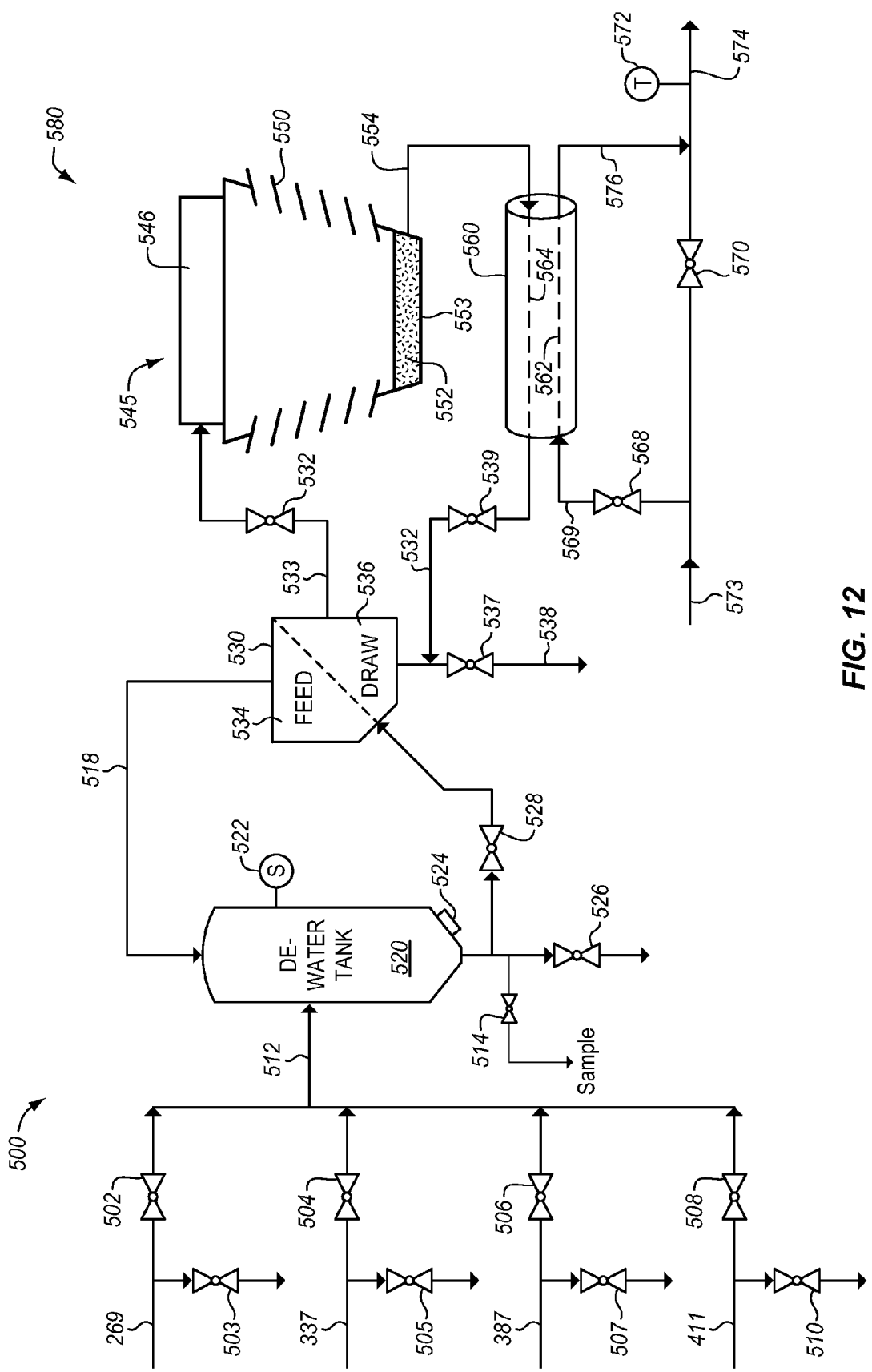
FIG. 12 is a block diagram of a dewatering system according to the invention that utilizes a forward osmosis unit.

FIG. 12 is a block diagram of one embodiment of a dewatering system 500 as may be used in the water processing system 100. Preferably, it is used for dewatering systems 802 and/or 858, though it may be used in other parts of the system also. Preferably, it is used in connection with a cooling system 580 as described below, though it may be used in other applications as well. System 500 is particularly useful when the water supply for system 100 is hot, such as when it comes directly from a hydrocarbon well. System 500 includes dewater tank 520, forward osmosis unit 530, and cooling system 580. Tank 520 may be connected to line 269 (FIG. 2A), line 337, line 387, or line 411 (FIG. 2B). The contents of lines 269, 337, 387, and 411 may be sampled via valves 503, 505, 507, and 510, respectively, and their connection of the lines into dewatering system 500 is controlled via valves 502, 504, 506, and 508, respectively. Water from the selected source is passed into dewatering tank 520 via line 512. The salinity, pH, and other parameters of the contents of tank 520 are sensed via sensor 522. The contents may be sampled via valve 514, and the tank may be drained via valve 526 or accessed via entry port 524. The water in tank 520 is cycled through forward osmosis (FO) unit 530, having feed side 534 and draw side 536. In the preferred embodiment, the fluid to be dewatered by FO unit 530 is coolant water from cooling tower 545 which is delivered to FO unit 530 via line 532, though in other embodiments it may be other sources of water with a higher concentration of solutes than the water in tank 520. The water in tank 520 may be sampled via valve 514 and the tank may be drained via valve 526. The dewatered and concentrated feed is passed back to tank 520 via line 518, and the draw is passed to cooling tower 545 via line 533 and processed as discussed below. Having a dedicated dewatering tank 520 and cooling tower 545 associated with FO unit 530 allows the reject from either first tank 264, second tank 330, third tank 382, or RO reject side 401 to be separated from the flow of processing system 200 and further concentrated and/or cooled without detracting from the flow of water through the system. Sensors 263, 329, and 385 are used to determine when the water should be directed out of the flow of processing system 200 into dewatering system 500. This ability to process water via an FO system makes the system 200 even more flexible and efficient, allowing it to efficiently process an even wider variety of different water from a wide variety of hydrocarbon wells.

The preferred cooling system 580 according to the invention that maybe used in combination with dewater tank 520 and ED system 530 also is illustrated in FIG. 12, and preferably comprises a cooling tower 545. Cooling system 580 preferably comprises a water heat exchanger 560 and tower system 545. Tower system 545 preferably includes a fluid distributor 546, a flow tower 550, a collection basin 553, and circulating coolant 552, which is preferably water. Preferably, either cross-flow or counter-flow cooling systems may be used. The passage of the water to the heat exchanger is controlled by valves 568 and 570. Water to be cooled passes along conduit 569 to heat exchanger conduit 562 where it transfers heat to coolant, preferably water, in heat exchanger 560, and returns to conduit 576 and thence to exit conduit 574. Coolant, in heat exchanger conduit 564, absorbs heat and then passes via valve 539 to conduit 532 and thence to FO unit 530. After absorbing water in FO unit 530, the fluid passes to distributor 546 of cooling tower 545. After the coolant is processed in flow tower 550, it is collected in collector 553 and passes through conduit 554 back to heat exchanger 560. FO unit 530 replaces water lost by evaporation in cooling tower 545. A temperature gauge 572 is connected to conduit 574 to monitor the temperature of the water exiting the cooling system 580. The coolant water may be sampled via line 538 and valve 537.

Figure 13:
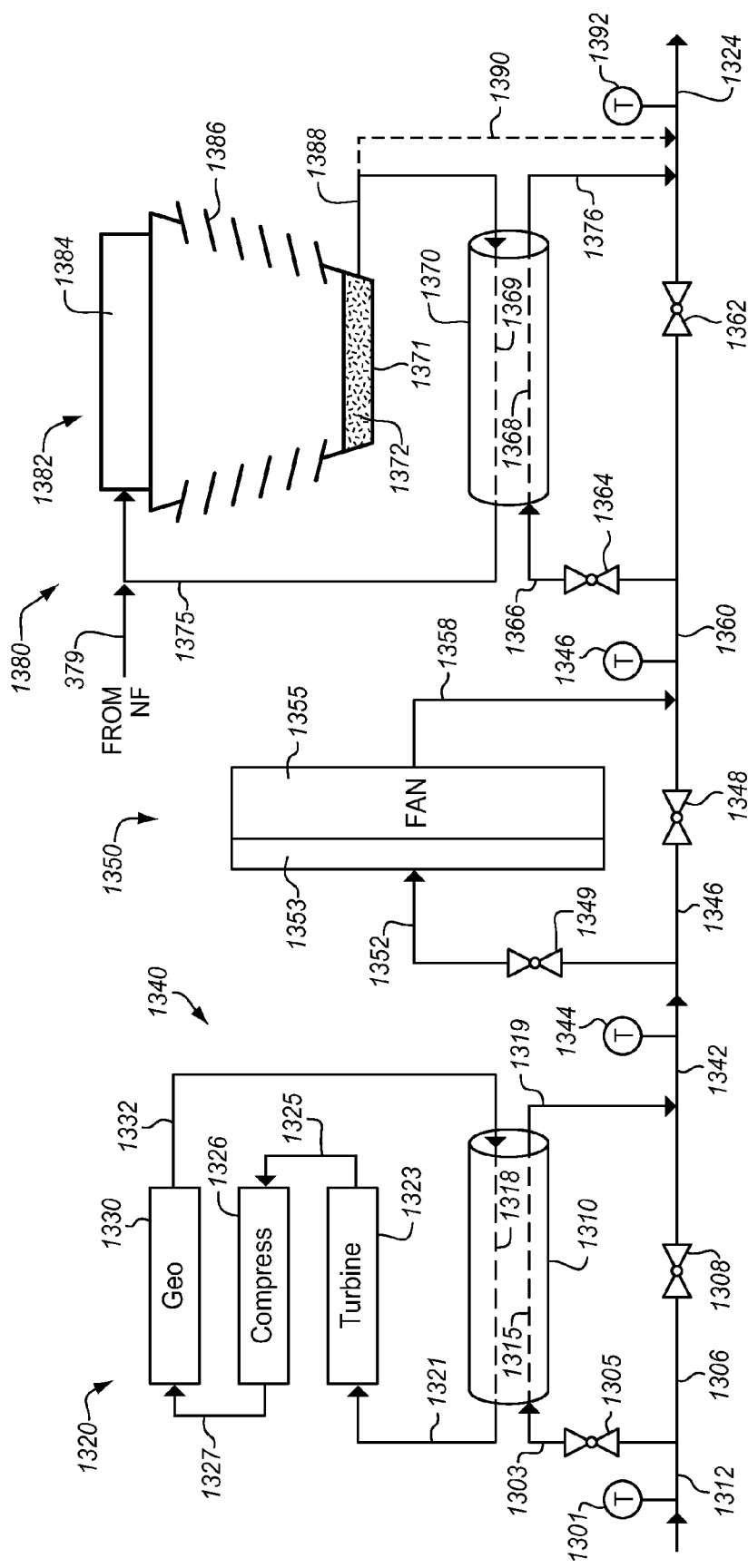
FIG. 13 is a block diagram of a preferred embodiment of a water cooling system used with the water conversion system according to the invention.

A more complete cooling system 1300 (FIG. 4) as may be used when the input water is hotter than required for efficient conversion is shown in FIG. 13. As indicated in FIGS. 2A, 2B, and 4, this cooling system preferably is located between the front end 311 and back end 317 of conversion system 200. This is because EC unit 258 and ultrafilter unit 290 usually are more efficient with hot water, while nanofilter 360 and reverse osmosis filter 400 operate better with cool water. Turning to FIG. 13, the preferred cooling system 1300 according to the invention is illustrated. Preferably, cooling system 1300 includes three subsystems: a geothermal system 1340, air cooling system 1350, and a cooling tower 1380. Depending on the amount of cooling needed, one, two, or all of the three subsystems are used. Processing water enters cooling system 1300 via conduit 1312. Temperature sensor 1301 measures the temperature and passes it to control system 110. Valves 1305 and 1308 direct the water through conduit 1303 to geothermal subsystem 1340 when valve 1305 is open and valve 1308 is closed, and cause the water to bypass the geothermal system when valve 1305 is closed and valve 1308 is open. Valves 1305, 1308, 1348, and 1349 direct the water through air cooling subsystem 1350 when valves 1308 and 1349 are open and valves 1305 and 1348 are closed, and cause the water to bypass the geothermal system 1340 and air cooling system 1350 when valve 1305 and 1349 are closed and valves 1308 and 1348 are open. The water is directed through cooling tower 1380 when valves 1308, 1348, and 1364 are open and valve 1362 is closed, and cause the water to bypass the cooling tower 1380 when valve 1364 is closed and valve 1362 is open. Those skilled in the art will recognize there are other combinations of systems 1340, 1350, and 1380.

Geothermal subsystem 1340 comprises water heat exchanger 1310 and refrigerating system 1320. Heat exchanger 1310 comprises a water conduit 1315 and a refrigerant conduit 1318. Refrigeration system 1320 includes a turbine 1323, a compressor 1326, and a geothermal heat exchanger 1330. The refrigerant absorbs heat from the water in heat exchanger 1310 and passes through conduit 1321 to turbine 1323 where the refrigerant expands and drives turbine 1323, utilizing the energy absorbed from the water. The refrigerant passes to compressor 1326 via conduit 1325 where it is compressed and heated. It then passes to cooling section 1330 which is preferably a geothermal heat exchange system, via conduit 1327, and then via conduit 1332 back to water heat exchanger 1310. Air cooling system 1350 preferably comprises a radiator 1353 and a fan 1355. If air cooling is desired, water passes to radiator 1353 where it is cooled by fan 1355 and then back to conduit 1360 via conduit 1358. Cooling tower system 1380 preferably comprises a water heat exchanger 1370 and tower system 1382. Tower system 1382 preferably includes a fluid distributor 1384, a flow tower 1386, a collection basin 1371, and circulating coolant 1372, which is preferably water. Preferably, in towers 580 and 1380, either cross-flow or counter-flow cooling systems may be used. A mechanical cross-flow-induced draft tower is a more economical approach where the water conversion system 100 is a mobile system, due to its simplicity and weight. A counter flow natural draft tower is particularly applicable where the water conversion system 100 is a potable water facility that is fixed in place or otherwise intended to be operable for long periods. Cooling towers 580 and 1380 primarily cool by evaporation but also utilize sensible heat loss and transference. Sensible heat loss occurs due to the hot water losing energy to the cooler air without any water loss. Transference occurs when the hot water is in contact with a metal surface, such as the piping in the cooling tower and heat exchanger. A typical cooling tower provides for temperature change (DT) in the range of 10° F. to 20° F. Alternatively, a waste heat evaporator can be used which uses the evaporation of water to cool the system and reduce the reject water to a solid that can be recycled or disposed of in a solid disposal system. A spray system may be used with such an evaporator. If the cooling tower 1380 is selected, water passes along conduit 1366 to heat exchanger conduit 1368 where it transfers heat to coolant, preferably water, in heat exchanger 1370 and returns to conduit 1376 and thence to exit conduit 1324. Coolant, in heat exchanger conduit 1369, absorbs heat and then passes along conduit 1375 to distributor 1384 of cooling tower 1380. After the coolant is processed in flow tower 1386, it is collected in collector 1371 and passes through conduit 1388 back to heat exchanger 1370. Nanofilter permeate water resupplies water lost in cooling tower 1380 via conduit 1377. A feature of the invention is that the cooling tower does not utilize blow-down or chemicals. A temperature gauge 1344 monitors the temperature in line 1342 between the geothermal subsystem 1340 and air cooling system 1350, temperature gauge 1346 monitors the water temperature in conduit 1360 between air cooling system 1350 and cooling tower 1380, and temperature gauge 1392 is connected to conduit 1324 to monitor the temperature of the water exiting the cooling system 1300.

In one embodiment of the invention 100, heat exchanger 1370 and the conduits 1366, 1368, 1369, and 1376 and valve 1364 are eliminated, and water 1372 from collector 1371 flows to conduit 1324 via conduit 1390. Since the water 1372 is chemically essentially the same as the water coming from the outlet 378 of NF stage 314, it can be fed back into the NF stage via conduit 324. The mixing of the hot water coming from conduit 1312 with the cooled water cools the water as efficiently as heat exchanger 1370. Any large particles that may get into water 1372 during the evaporation process either settle in NF tank 380 or are filtered out in filter 344. In this embodiment, valve 377 (FIG. 2B) is adjusted so that a larger portion of the flow in conduit 378 flows back to cooling tower system 1382 than in the heat exchanger embodiment.

Pumps such as 286 are preferably Frenic™ Mini pumps, with the ultrafilter pump being a 7.5 horse power pump, and pumps 338 and 390 being 7 horse power pumps. Peroxide metering unit 272 and acid metering units 352 and 398 are preferably Aquatrac™ Multiflex meters. Filters 344 and 394 are preferably Falthrap™ spiral filters. Pump size and make will vary with system size.

It is a feature of the invention that the electro-coagulator 250 and ultrafilter 290 remove the nucleotides and organics right in the front end 311. Conventional EC units cannot handle solids. Other systems for processing produce water and/or flow back water use chemicals, such as ferric alloys and magnesium, and other flocculants and may use ozone in the front end to handle organics. All of these create more waste and are more costly. Further, the waste often is deep well injected; and since it contains organics, it may cause problems with drinking water. Still others use activated carbon or charcoal which is expensive and also creates more waste. Fundamentally, prior art systems use methods of taking out low level contamination to try to take out high levels of contamination. In contrast, the ability of coagulator 250 to control the voltage, current, and time they are applied, and the ability of the system to adjust electro-coagulator 250 based on the temperature, pH, and conductivity, allows solids to be coagulated. In prior art systems that used electro-coagulation, high conductivity in the water could cause the water to boil. In the present system, the voltage, current, and time they are applied are controlled in response to sensors 252, 232; and the flow of water in the system is determined by valve 234 so as to avoid boiling and other potential problems in EC unit 250.

A feature of the invention is that the electro-coagulation stage 312 removes the bulk of suspended particles including mineral and carbon particles, hair, many pigments, and larger organisms such as giardia and cryptos poridium. Many bacteria and oil emulsions also are removed. Another feature of the invention is that the ultrafilter stage 313 of the conversion system 200 removes any remaining suspended solids mentioned above, including bacteria and viruses. It also removes proteins, such as milk proteins, gelatin, and colloidal silica. Generally, multivalent ions and monovalent ions, as well as the water, will pass through ultrafilter 290. Nanofilter stage 314 preferably removes multivalent ions, such as synthetic dyes and sugars, and begins to remove aqueous salts and meal ions. It also removes any suspended and other solids mentioned above, including viruses and bacteria, which might be remaining. Reverse osmosis stage 317 removes monovalent ions as well as any remaining multivalent ions and other materials mentioned above and passes the water.

Another feature of the invention is the ability to selectively remove inorganic materials, such as boron and phosphorous.

A further feature of the invention is its ability to handle high hardness water up to 50,000 parts per million. Another feature of the invention is that the system of the invention can handle extremely high levels of conductivity, for example, as high as 100,000 to 200,000 microsiemens. A related feature of the invention is that the conductivity, temperature, and pH of the water being processed is monitored and adjusted throughout the system, particularly in the receiving tank 129, the pre-processing tank 152, the first tank 264, the second tank 330, and the third tank 380. This close control of the pH, conductivity, and temperature provides great flexibility in the system, allowing it to effectively and efficiently process water from a wide variety of sources.

Another feature of the invention is electrodyalisis used in conjunction with the nanofilter 360 and reverse osmosis filter 400. ED units 445 and 460 are used to condition the RO and Nano reject to increase solids from 7 percent to 9 percent to about 20 percent to 21 percent solution. While ED, nano, and RO are relatively expensive, most of the heavy contamination is removed in the front end 211, which allows the flow through the back end 317 to be less, thus lowering the cost. In fact, depending on the analysis, the process of the invention 900 may not use the nano and/or RO. Above about 8 percent solids, RO does not work well. In this case, the process uses ED to get from 8 percent to 21 percent solids. In many areas where the deep ground water is already contaminated, this can be injected. In other areas, this can be disposed of as a solid, with only a small amount of evaporation or dewatering. When the waste is so thoroughly dewatered as to be 21 percent solids, the result is often a by-product instead of a waste product.

Another feature of the invention is that VOCs (volatile organic compounds), natural gas, and hydrogen are vented at a fixed point vent out of first tank 264. This creates a source point solution to these gases in contrast to non-source point air pollution, for example in holding ponds, where it is difficult or impossible to determine the exact location of the pollution source. Herein, a source point is an area of 100 square feet or less through which pollution gases must pass, and more preferably 50 square feet or less, and most preferably 20 square feet or less. In the preferred embodiment, vent 275 provides the source point. In the preferred embodiment, the area of vent 270 through which the potential air pollution gases pass is less than one square foot in area. By the time the water reaches any of the dewatering, evaporation, or injection systems or other end locations 802, 810, 820, 823, 827, 835, 848, 854, 858, 874, or 878, all gases are long since gone from the system. Preferably, basin 152 is enclosed so that gases flow from it to a source point. In the preferred embodiment, vent 275 is the source point, though, a vent also can be provided to basin 152 to create another or a different source point. Having a source point allows the system 100 to burn the gases to make heat which can be used in evaporators and crystallizers. Such point source solutions to pollution gases are much preferred by government regulators.

A feature of the invention is that the water conversion is performed with relatively small waste. A further feature of the invention is that, because it is a balanced system and requires little maintenance, it can sustain large fresh water, non-contaminated water, or potable water flows almost indefinitely. Another feature of the invention is that most of the suspended solids, about 99%, come from first tank/ hydraulic break 264. This permits the water to be put through a dewatering process such as a centrifuge with the resulting products being a semi-dry sludge and a stream of water that is returned to the head of the system at 230 to be recycled. A further feature of the invention is that any remaining multivalent ions are removed at the second tank/hydraulic break 330 resulting in a waste stream that is characterized by high hardness and metals. This waste stream is either evaporated at 823 or put through an alternative process at 827 or 835 if there are other valuable ions in it. The residue from the evaporation can be land filled. The point at which the waste is removed is determined by conductivity and based on the Langelier Saturation Index (LSI). A further feature of the invention is that third tank/hydraulic break 380 is composed of monovalent ions, mostly NaCl. As high concentration brine has value, one alternative is to take the blow down from tank 380 at about 8% TDS and concentrate it up to between 21% and 40%. This cuts down on disposal and provides a byproduct that can be sold directly or used as raw feed for a process to give it value, such as making sodium hyper chlorite or sodium chlorite, both marketable chemistries.

Another feature of the invention is its flexibility. The combination of an equalization and homogenization basin 152, an electro-coagulation unit in which the voltage, current, and time of application of the voltage and current can be independently controlled, a nanofiltration unit that removes organics, and three hydraulic breaks 264, 330, and 380 allows a variety of produce water and/or flow back water from a plurality of hydrocarbon wells to be converted to fresh, non-contaminated or potable water. In particular, the flexible EC system allows a wide variety of produce water and/or flow back water sources with a wide plurality of conductivities to be handled. The availability of an ED unit to dewater waste allows a wider variety of salinities to be handled. The fact that the process of the invention includes multiple checks, such as registration and verification electronics 170, receiving system 120, preprocessing system 105, and storage system 203 increases the flexibility and the variety of produce water and/or flow back water sources because it prevents anomalous water inputs from shutting down the system.

Now that the water conversion system of the invention has been described, it is evident that it can be used for purposes other than processing produce water and/or flow back water. As mentioned above, it can be used to provide emergency water when storms and natural or man-made disasters damage a water supply; it can be used for water contaminated during food processing, such as soy oil production and refining; and it can be used to clean sea water on ships and oil platforms and many other contaminated water sources, There has been described a water conversion system that minimizes environmental impact of produced water and/or flow back water, converts produced water and/or flow back water to fresh, non-contaminated and/or potable water, and is particularly useful in processing produced water and/or flow back water from a wide variety of sources. Now that the invention has been described in terms of produced water and/or frack flow back water, those skilled in the art will be able to adapt it to other contaminated water. It will also be evident to those skilled in the art that the various parts of the invention may be combined in many different ways. It should be understood that each of the elements described can be combined with any of the other elements. Additional advantages and modifications will readily appear to those skilled in the art. The invention in its broader aspects, therefore, is not limited to the specific details, representative apparatus and methods, and illustrative examples shown and described. Accordingly, departures may be made from such details without departing from the spirit or scope of the invention claimed below.

What is claimed is:

1. A method of processing produced or frack flow back water to produce fresh, non-contaminated or potable water, said method comprising:
    recording and verifying the contents of water carried in a plurality of mobile vehicles, each said vehicle carrying a load of contaminated produced water or frack flow back water from a hydrocarbon well;
    discharging said water to a pre-processing basin where it is mixed and homogenized with water from twenty or more of said plurality of vehicles;
    removing hydrocarbons from said water;
    processing said water from said preprocessing basin, said processing including:
    providing an electro-coagulation reactor, an oxidation reactor, an ultrafilter, and a nanofilter;
    electro-coagulation of water in said electro-coagulation reactor and oxidizing the contaminants in said water in said oxidation reactor;
    filtering said water through said ultrafilter and said nanofilter to convert the water to fresh, non-contaminated or potable water;
    recycling and/or disposing of contaminants removed from said water in said electro-coagulation, oxidizing, and filtering processes; and
    recycling said processed water, wherein said processing further comprises providing a source point at which potential air pollution gases are removed from said water, during the oxidizing, and further including a recycling system for recycling or using said gases.

2. A method as in claim 1 wherein said discharging comprises:
    off-loading said water from one of said vehicles into a temporary receiving tank;
    analyzing said off-loaded water and determining that it is suitable for processing; and
    transferring said water to said pre-processing basin.

3. A method as in claim 1 wherein said processing further comprises breaking said flow of water between said electro-coagulator and said nanofilter by flowing it into a first tank.

4. A method as in claim 1 wherein said filtering further comprises filtering said water through a reverse osmosis filter after said nanofiltering.

5. A method as in claim 1 wherein said processing further comprises performing electrodialysis on said water after said nanofiltering.

6. A method as in claim 1 wherein said recycling said water comprises adding calcium or magnesium to said water.

7. A method as in claim 1 wherein said recording and verifying comprises weighing said vehicles.

8. A method as in claim 1 wherein said recording and verifying comprises storing a sample of water from each of said plurality of vehicles.

9. A method as in claim 1 wherein said processing further comprises:
    providing a sensor selected from the group consisting of a conductivity sensor, a pH sensor, and a level sensor; and wherein said electro-coagulating comprises:
    providing an electro-coagulation (EC) system comprising a pulsing system for applying voltage and current pulses to said water, said pulsing system including a modulator for varying the voltage, current and pulse frequency applied to said water; and controlling said voltage or current using said sensor.

10. A method as in claim 9 wherein said sensor includes a flow meter and said processing further comprises controlling the flow of said water through said EC system using said sensor.

11. A water conversion system for converting water with conductivity of 10,000 microsiemens or more to fresh, non-contaminated, or potable water, said system comprising:
- a source of water having a conductivity of 10,000 microsiemens or more;
- a pre-treatment system for removing hydrocarbons from said source of water;
- an electro-coagulation (EC) system comprising a pulsing system for applying voltage and current pulses to said water, said pulsing system including a modulator for varying one or more of the voltage, current, pulse frequency, and time electrical power is applied to said water, the electro-coagulation system in fluidic communication with the pre-treatment system;
- an oxidizing reactor, the oxidizing reactor in fluidic communication with the electro-coagulation system;
- an ultrafilter including an ultrafilter membrane, the ultrafilter membrane in fluidic communication with the oxidizing reactor;
- a pump for pumping said source of water through said pretreatment system, then through said EC system, then through said oxidizing reactor, and then through said ultrafilter; and
- a source point, in fluidic communication with the oxidizing reactor, through which potential air polluting gases pass out of said water and a recycling system for recycling or using said gases.

12. A water conversion system as in claim 11 wherein said oxidizing reactor comprises a first tank creating a flow break between said electro-coagulator and said ultrafilter and wherein said source point comprises a vent on said tank.

* * * * *